(12) United States Patent
Frederick et al.

(10) Patent No.: US 7,117,043 B1
(45) Date of Patent: Oct. 3, 2006

(54) METHOD FOR PROGRAMMING A PROGRAMMABLE LOGIC CONTROLLER

(75) Inventors: Blaine Thomas Frederick, Indianapolis, IN (US); Patrick A. Hickok, Cicero, IN (US); Dale S. Kougel, Greenfield, IN (US)

(73) Assignee: integrator.com, Noblesville, IN (US)

(*) Notice: Subject to any disclaimer, the term of this patent is extended or adjusted under 35 U.S.C. 154(b) by 662 days.

(21) Appl. No.: 10/402,675

(22) Filed: Mar. 28, 2003

Related U.S. Application Data

(60) Provisional application No. 60/368,469, filed on Mar. 28, 2002.

(51) Int. Cl.
- G05B 11/01 (2006.01)
- G05B 9/02 (2006.01)
- G06F 1/24 (2006.01)
- G06F 15/00 (2006.01)
- H04L 9/00 (2006.01)

(52) U.S. Cl. ............... 700/21; 700/23; 700/25; 700/79; 700/80; 713/100; 713/150; 715/503; 715/504; 715/509; 715/511; 726/6; 726/9

(58) Field of Classification Search ............... 700/17, 700/18, 23, 79–80, 83, 86–89, 21, 25; 715/503, 715/505, 509, 511, 530; 713/100–150; 726/6, 726/9
See application file for complete search history.

(56) References Cited

U.S. PATENT DOCUMENTS

| | | | |
|---|---|---|---|
| 5,119,318 A * | 6/1992 | Paradies et al. ............... 706/52 |
| 5,453,933 A * | 9/1995 | Wright et al. ............... 700/181 |
| 5,668,735 A * | 9/1997 | Dominguez et al. .......... 702/24 |
| 5,825,361 A * | 10/1998 | Rubin et al. ................. 715/839 |
| 6,026,352 A * | 2/2000 | Burns et al. ................. 702/182 |
| 6,411,923 B1 * | 6/2002 | Stewart et al. ................. 703/25 |
| 6,834,370 B1 * | 12/2004 | Brandl et al. ............... 715/500 |
| 6,944,616 B1 * | 9/2005 | Ferguson et al. .............. 707/10 |
| 6,944,681 B1 * | 9/2005 | Christensen et al. ........... 710/8 |
| 6,975,913 B1 * | 12/2005 | Kreidler et al. ............... 700/96 |
| 2002/0013634 A1 * | 1/2002 | Lee ............................. 700/97 |
| 2003/0130899 A1 * | 7/2003 | Ferguson et al. ............. 705/26 |

OTHER PUBLICATIONS

Internet information on Pinnacle Electronic Systems, Inc. www.pinnaclesystemsinc.com, 9 pages, Jun. 24, 2003.
Internet information on Accurate Controls, Inc., www.accuratecontrols.com, 8 pages, Jun. 24, 2003.
Internet homepage for Com-Tec, Inc., www.com-tecinc.com, 1 page, Jun. 24, 2003.

* cited by examiner

*Primary Examiner*—Ramesh Patel
(74) *Attorney, Agent, or Firm*—Baker & Daniels LLP

(57) ABSTRACT

A method for programming a programmable logic controller (PLC) is disclosed. The PLC may be used to control devices of a secured facility, such as a detention center, jail, or prison. The disclosed method may include creating a spreadsheet including information relating to devices and functions of a system to be controlled by the PLC, such as the number and type of door locks and the functionality of the door locks. The method may further include analyzing the spreadsheet to detect errors in the information stored in the spreadsheet. The method may further includes writing PLC logic to control the system based in the information in the spreadsheet.

33 Claims, 15 Drawing Sheets

FIG. 10

METHOD FOR PROGRAMMING A PROGRAMMABLE LOGIC CONTROLLER

CROSS-REFERENCE TO RELATED APPLICATIONS

This application claims priority under 35 U.S.C. § 119(e) to U.S. Provisional Patent Application Ser. No. 60/368,469 filed Mar. 28, 2002, the disclosure of which is hereby incorporated by reference herein.

FIELD OF THE INVENTION

This invention relates generally to security systems and to software logic for controlling the security system.

BACKGROUND OF THE INVENTION

A Programmable Logic Controller (PLC) is an industrial computer used to control and automate complex systems. PLCs are typically found in factory type settings. PLCs are used to control robots, assembly lines and various other applications that require a large amount of data monitoring and control. In addition to the PLC itself, there are many different components that can be connected to the PLC using either an open protocol, such as, for example, RS-232, or a proprietary protocol, such as, for example, Allen-Bradley® Remote I/O (input/output) available from Rockwell Automation, Milwaukee, Wis. The PLC and all of the peripheral components linked to the PLC define the control system.

PLCs can be programmed using different development platforms. One common development platform is called ladder logic. Ladder logic is a programming language based on executing commands on a line-by-line permission system. As a PLC program executes, the processor checks to see if there is a permissive statement on the left side of a ladder rung. If that permissive statement is true or if there is no permissive statement, the processor performs the operation on the right side of the ladder rung. When one rung is executed, the processor moves to the next rung down of the ladder in a sequential fashion. This process is called a ladder scan. Depending upon the manufacturer of the PLC, the exact scan sequence may be different. Typically, the PLC will determine if the states of the various peripherals, such as a Remote I/O, have changed since the previous scan. If the state of any peripheral has changed, the PLC will update the information in its memory, and then perform its ladder scan based upon the most current information.

SUMMARY OF THE INVENTION

According to one aspect of the invention, a method for programming a programmable logic controller (PLC) is provided. The method includes creating a spreadsheet including information relating to devices and functions of a system to be controlled by the PLC, analyzing the spreadsheet, and writing PLC logic to control the system.

Illustratively according to this aspect of the invention, analyzing the spreadsheet includes opening the spreadsheet, reading the spreadsheet, and calculating the number of each device type within the spreadsheet. Analyzing the spreadsheet further includes determining a number of required files and assigning PLC file designators to the files.

Further illustratively according to this aspect of the invention, the spreadsheet includes information relating to a user interface station and analyzing the spreadsheet further includes calculating a number of user interface stations.

Additionally illustratively according to this aspect of the invention, analyzing the spreadsheet further includes creating a software documentation file including the number of each device type, the PLC file designator, and the number of user interface stations. Still further, Analyzing the spreadsheet includes passing the file numbers and the number of user interface stations to a write-PLC logic subroutine for writing the logic to control the system.

Further illustratively according to this aspect of the invention, analyzing the spreadsheet includes transferring information within the spreadsheet to a database. Additionally, writing PLC logic to control the system includes transferring data between a write-PLC logic subroutine and the database as well as transferring data between a write-PLC logic subroutine and the spreadsheet.

Illustratively according to this aspect of the invention, writing PLC logic to control the system includes writing ladder logic algorithms to control the devices and functions listed within the spreadsheet.

Additionally illustratively according to this aspect of the invention, the method is for creating software to program the PLC for automating and controlling a security system.

According to another aspect of the invention, a method for programming a PLC includes entering customer information including devices and functions of a system to be automated into a spreadsheet, reading the customer information from the spreadsheet, and storing the customer information from the spreadsheet in a database. The method further includes analyzing the database and generating a software program based on the customer information in the database.

Illustratively according to this aspect of the invention, analyzing the database includes determining quantities and types of devices of a system to be controlled by the PLC. Further, generating the software program includes creating a program file for the PLC, creating a PLC tag database, and setting device masks.

Additionally illustratively according to this aspect of the invention, the method further includes generating a software tag listing including the tags used from the PLC tag database and the purpose of each tag.

Further illustratively according to this aspect of the invention, the method further includes assigning names to specific devices and functions and creating files containing the names assigned to the specific devices and functions. Illustratively, creating files containing the names assigned to the specific devices and functions includes creating files containing configuration information for the devices and functions.

Additionally illustratively according to this aspect of the invention, analyzing the database includes determining whether the system is to include more than one PLC.

Further illustratively according to this aspect of the invention, the method further includes displaying a user interface with results of the analysis of the customer information. Additionally illustratively, the method further includes modifying at least one of customer information and the database.

Illustratively according to this aspect of the invention, the method is for programming a PLC for automating and controlling a security system.

According to yet another aspect of the invention, a method for programming a programmable logic controller (PLC) for automating and controlling a security system is provided. The method includes identifying customer information including devices of the security system, a location of each device of the security system, and a quantity of each device of the security system, creating a spreadsheet including the customer information, and checking the spreadsheet. The method further includes storing information from the spreadsheet in a database, analyzing the database, and displaying a user interface with results of the analysis of the customer information. The method further includes modifying at least one of customer information and the database via the user interface to create modified results, transferring the modified results to a subroutine, and writing PLC software configured to automate and control the security system.

Illustratively according to this aspect of the invention, analyzing the database includes determining a number of PLCs, a number of floor plan screens, and a quantity of each device type.

Further illustratively according to this aspect of the invention, checking the spreadsheet includes opening the spreadsheet, reading the spreadsheet, and verifying that the customer information in the spreadsheet is of the proper type and value range.

Additionally illustratively according to this aspect of the invention, identifying customer information includes identifying the termination point of each device and identifying the I/O necessary to make each device operate.

According to still another aspect of the invention, a computer system is provided for programming a programmable logic controller (PLC). The computer system includes a processing unit, and a memory electrically coupled to the processing unit, the memory having stored therein a plurality of instructions which, when executed by the processing unit, causes the processing unit to perform the following functions: (i) transfer the customer-entered information from the spreadsheet to a database for storage of the customer-entered information, (ii) analyze the project, and (iii) write PLC logic to control the facility.

According to yet another aspect of the invention, a method for programming a PLC for controlling a security facility is provided. The method includes writing at least one of the following door ladders: an autorelock ladder to automatically lock doors that are unlocked, an unlock ladder to selectively unlock a door, a door-violation ladder to inform an operator that a door in the facility has been opened by a means other than the PLC, and an emergency release ladder to selectively unlock an emergency release group of doors, determining whether the security facility has one or more sliding or overhead doors, and writing at least one of the following ladders if the security facility has one or more sliding or overhead doors: a sliding-overhead ladder to control an amount of time power is applied to one or more of the sliding or overhead doors to control a duration of the travel of the one or more sliding or overhead doors, and a stop command ladder to selectively stop the operation of the one or more sliding or overhead doors.

The method further includes determining whether the security facility has one or more intercoms, writing at least one of the following ladders if the security facility has one or more intercoms: an intercom ladder to control operation of the one or more intercoms, and a pending ladder to monitor the one or more intercoms if a call button of the one or more intercoms has been pressed prior to connection of the one or more intercoms for communication, writing a pulsed-door ladder to unlock one or more full-cycle locks of the security facility, and determining whether the security facility requires a door isolation function.

Additionally, the method includes writing a door isolation ladder if the security facility requires a door isolation function to isolate select doors and prohibit the select doors from normally being opened, determining whether the security facility requires an intercom isolation function, and writing an intercom isolation ladder if the security facility requires an intercom isolation function to selectively deactivate one or more intercoms to prevent audible incoming calls from being received from those intercoms which have been deactivated.

The method still includes determining whether the security facility has one or more video cameras, writing a video ladder if the security facility has one or more video cameras to control the one or more video cameras within the security facility, determining whether the security facility requires a communication feature, writing a quick-comm ladder if the security facility requires the communication feature to establishes audio communications from a control panel when a user presses a communications button of an intercom within the facility, and writing an interlock ladder to control the operation of one or more hardware sets where two or more doors form a sallyport.

The method further includes determining whether the security facility has one or more utilities, writing a utilities ladder if the security facility has one or more utilities to control the functions of the one or more utilities, determining whether the security facility has one or more alarms, writing an alarms ladder if the security facility has one or more alarms to control the functions of the one or more alarms, determining whether the security facility has one or more predetermined groups of devices designated for at least one of the door and intercom systems, and writing a group ladder if the security facility has one or more groups of devices designated to selectively control the functions of the one or more predetermined groups of devices.

Additionally, the method includes determining whether the security facility has one or more watchtour stations, writing a watchtour ladder if the security facility has the one or more watchtour stations to monitor an activation of the one or more watchtour stations by an officer patrolling the facility, determining whether the security facility has one or more access devices, writing an access ladder if the security facility has the one or more access devices to monitor and process door unlock requests, writing an inputs ladder to control the number of times a bit is turned on within the PLC and to de-bounce a switch within the PLC for security facility functions controlled by the PLC which bounce before reaching a steady state position, writing a timer ladder to turn bits on and off in the PLC, and writing a Security Systems Management (SMS) ladder to interface with software of a security management server of the facility to translate data in the PLC to a form that is readable by the user.

Illustratively according to this aspect of the invention, the method further includes determining whether the security facility has one or more doors before the step of writing at least one of the following door ladders, and the step of writing at least one of the following door ladders includes writing at least one of the following door ladders if the security facility has one or more doors.

Further illustratively according to this aspect of the invention, the method further includes determining whether the security facility has one or more full-cycle locks before the step of writing the pulsed-door ladder, and the step of writing the pulsed-door ladder includes writing the pulsed-door ladder if the security facility has one or more full-cycle locks.

Additionally illustratively according to this aspect of the invention, the method further includes determining whether the security facility requires the interlock function before the step of writing the interlock ladder. Further, the step of writing the interlock ladder includes writing the interlock ladder if the security facility requires the interlock function.

Illustratively according to this aspect of the invention, the method further includes determining whether the security facility has one or more paging systems before writing the page ladder. Writing the page ladder includes writing the page ladder if the security facility has one or more paging systems.

Further illustratively according to this aspect of the invention the method further includes determining whether the security facility has one or more access control systems, and writing an access control ladder if the security facility has one or more access control systems to configure each user of the facility for one or more of the following: user name, proximity card identification, operator-definable access groups, and operator-definable time groups.

Additionally illustratively according to this aspect of the invention, the method further includes determining whether the security facility requires the SMS function before the step of writing the SMS ladder, and the step of writing the SMS ladder includes writing the SMS ladder if the security facility requires the SMS function.

BRIEF DESCRIPTION OF THE DRAWINGS

The invention may best be understood by referring to the following detailed description and accompanying drawings which illustrate the invention. In the drawings:

FIG. 10 illustrates a Submittal Schedule of the type illustrated in FIG. 1;

DETAILED DESCRIPTION OF AN ILLUSTRATIVE EMBODIMENT

Figure 1:
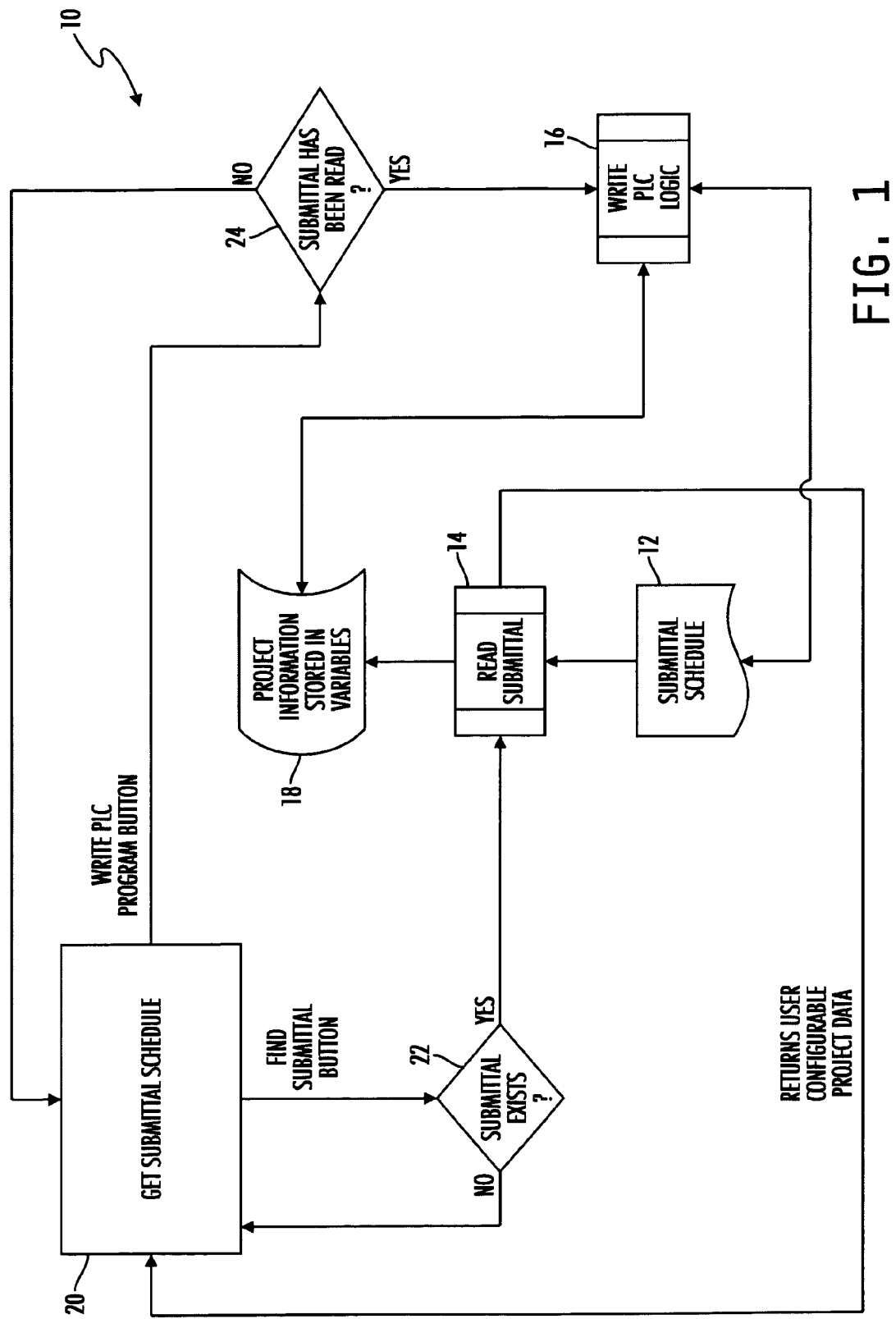
FIG. 1 illustrates a data flow diagram of the main flow of a first embodiment of the present program.

A method for creating a software program for automating and controlling a security system is provided. This method generally includes reading information about a particular job or project submitted by a customer and analyzing the information submitted to compile and write an efficient program for controlling that particular customer's specific security system. An illustrative program 10 for reading and analyzing information submitted, for compiling that information, and for writing software for a PLC is illustrated in FIG. 1. The illustrated program 10 is specifically adapted for use with detention facilities, such as, for example, jails and prisons. However, the program 10 is believed to be useful in other applications as well.

A PLC is used to control and monitor the systems of a detention facility such as a jail or a prison, for example. Examples of some prison operations or devices which may be controlled by a system according to the present invention include unlocking and locking doors, flushing toilets, controlling intercoms and video cameras, and so on. These operations may be controlled through a liquid crystal display (LCD) flat panel touchscreen of the type illustrated in FIG. 9. Each device or function to be controlled by a PLC in such a facility is assigned a number or symbol, for example, a bit, in a data file. This bit is that device's or function's unique identification and will be the same in every logic statement performed on files pertaining to that device or function.

The touchscreen can display a combination of icon buttons and function buttons. The icon buttons include, for example, a Door Icon button, a Communicate Icon button, a Camera Icon button, a Page Icon button, Utilities Icon buttons, and Group buttons, for example. The function buttons include an Unlock button, a Stop button, a Hold Open button, an Isolate button, an Inmate Access button, Utilities buttons, an Interlock Override button, an Emergency Evacuation button, a Disable Panel button, a Watch Tour button, a Silence button, and a Reset button, for example.

Pressing any of the function buttons results in a Digitized Voice Interaction (DVI) announcing the action performed. An example of the process or steps a user might take to unlock a particular door, for example, includes pressing the Unlock Icon in a Door Control menu area. This causes the DVI to announce "unlock." The user then has three seconds to press the Door Icon Button pictured at the location of the door the user wants to unlock and the door is unlocked. Other Door Icon Buttons may be pressed within three seconds of the first to unlock other doors in the facility. Three seconds after the last button push, the unlock command is cancelled, and door unlock is disabled.

Each facility, however, is unique. Therefore, the PLC code created for each facility by program 10 is also unique. For example, different facilities have different numbers of doors, intercoms, video cameras, and so on, to be controlled. Further, some facilities may have fairly unique functional requirements, requirements that other facilities do not have. The Watch Tour function, for example, is used by facilities to prompt guards to walk throughout the facility and check on the status of the inmates. There are buttons and/or sensors located around the facility that the guard must activate as he/she conducts the watch tour. If the buttons or sensors are not activated in a predetermined time interval, an alarm is sounded. However, this particular feature might not be desired in a courthouse facility, for example. It would therefore be inefficient to waste PLC memory by including in the PLC for such a facility the capability to write the code for the Watch Tour portion of the program. Another item which will vary from security system to security system is the I/O between the devices and the PLC.

Figure 9:
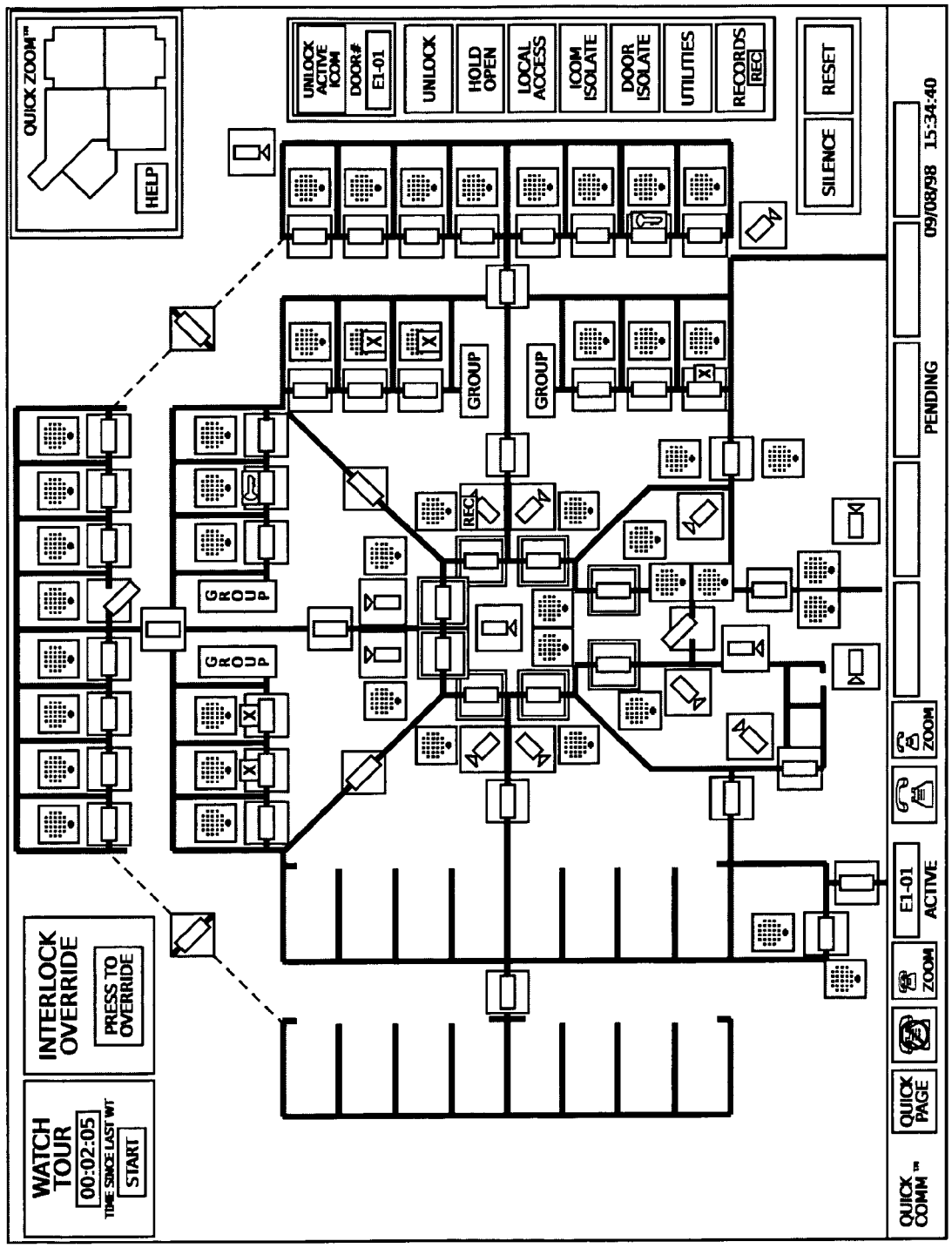
FIG. 9 illustrates a touchscreen display of the type which may be generated by a system constructed according to the present invention.

A typical facility will have several different touchscreens (TS) illustrating the overhead view of the facility, as shown, for example, in FIG. 9. Each touchscreen can be called up on the monitor by touching the proper place on a smaller picture representing the entire facility. The icons and screen layouts are used in conjunction with the program 10 and differ from facility to facility. Each device can be displayed in different states. These states are associated with tags. The tags are used to interface Wonderware® software by Wonderware Corporation, Irvine, Calif., with the PLC. Interfacing is facilitated with Microsoft® Dynamic Data Exchange (DDE) protocol by Microsoft Corporation, Redmond, Wash. The Wonderware® software sends information to, and receives information from, the PLC via a Wonderware®

ABTCP (Allen-Bradley Transmission Control Protocol) server. The ABTCP server uses a proprietary protocol to interrogate the PLC's data tables. These data tables contain all of the information for each device, as described below.

The state of each device is monitored by the I/O in the PLC. Then, based on this state and a series of complex logical operations, the status of the device is determined and sent to the touchscreen. Because of the multiple states that each device can have, thousands of tags must be monitored and sent to the proper icon. This is done using a database that resides in the Wonderware® application. A memory location in the PLC is related to the tag in the Wonderware® software. Again, this database varies from job to job. After the software is completed, it is tested in a facility with Security Equipment Cabinets (SECs) that have been constructed during the time the software is being written.

The program 10 described herein uses Microsoft® Excel and Rockwell Software® RSLogix5™ Professional (RSLogix) software to automate the software-writing portion of the job process. Microsoft® Visual Basic (VB) and Microsoft® Visual Basic for Applications (VBA) are used in automating and integrating the three above-mentioned software packages into a single stand-alone application that completes the software for the job. VBA is the language used to program VB applications. This permits the above-mentioned software packages to be integrated using the Component Object Model (COM) of each package.

Figure 10:
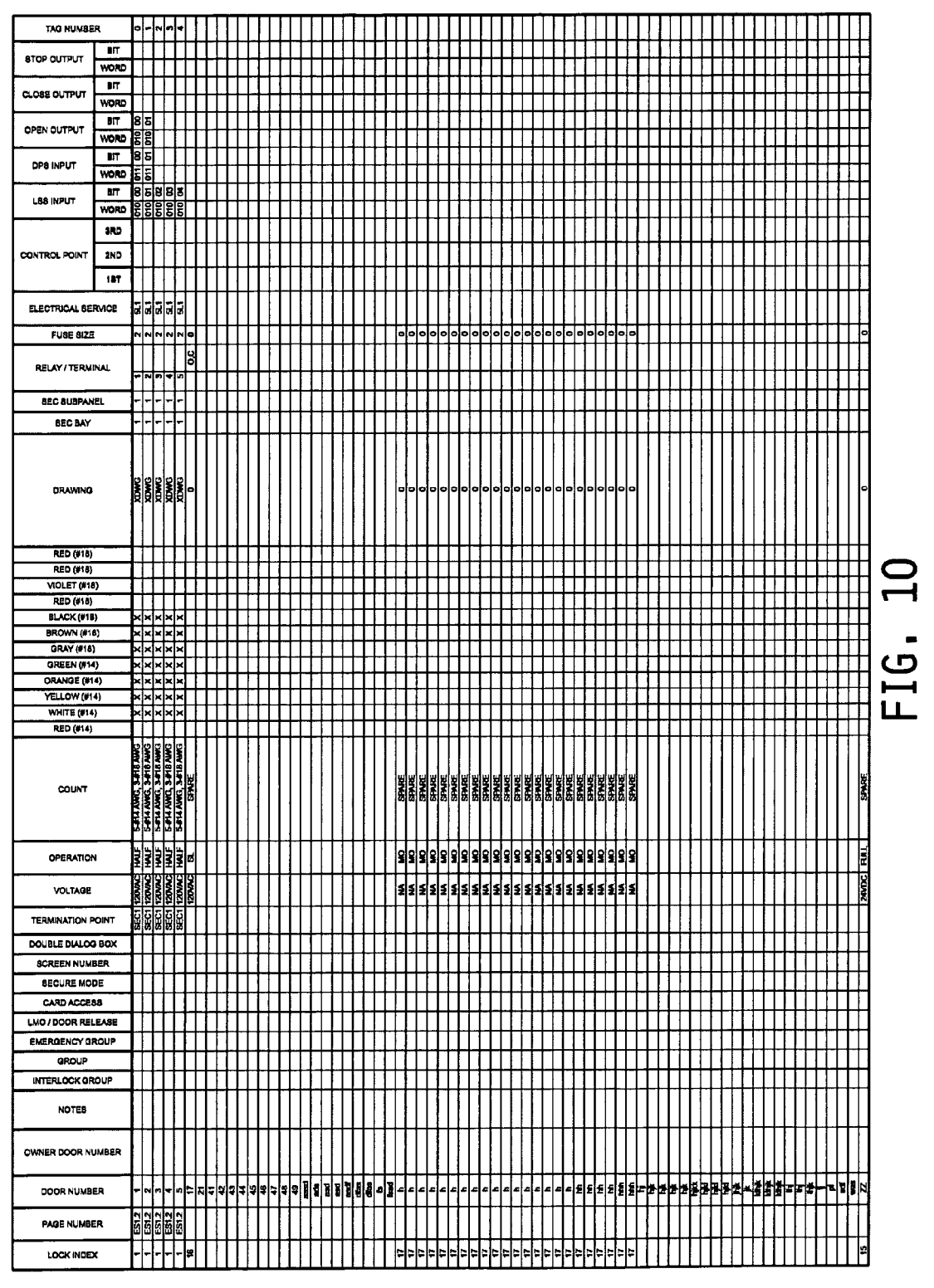

Initially, all devices for the job are identified and their quantities and locations are verified. The customer information regarding the job is entered into and stored within a Submittal Schedule 12. Submittal Schedule 12 is, for example, a Microsoft® Excel spreadsheet, as illustrated in FIG. 10. Nearly every piece of information needed for program 10 is contained within the Submittal Schedule 12. The most important pieces of information gathered are the type of device, termination point in the SEC and the I/O that is necessary to make the device operate. Once the Submittal Schedule 12 has been created, the program 10 is prepared to begin writing the software or logic for the PLC.

Figure 2:
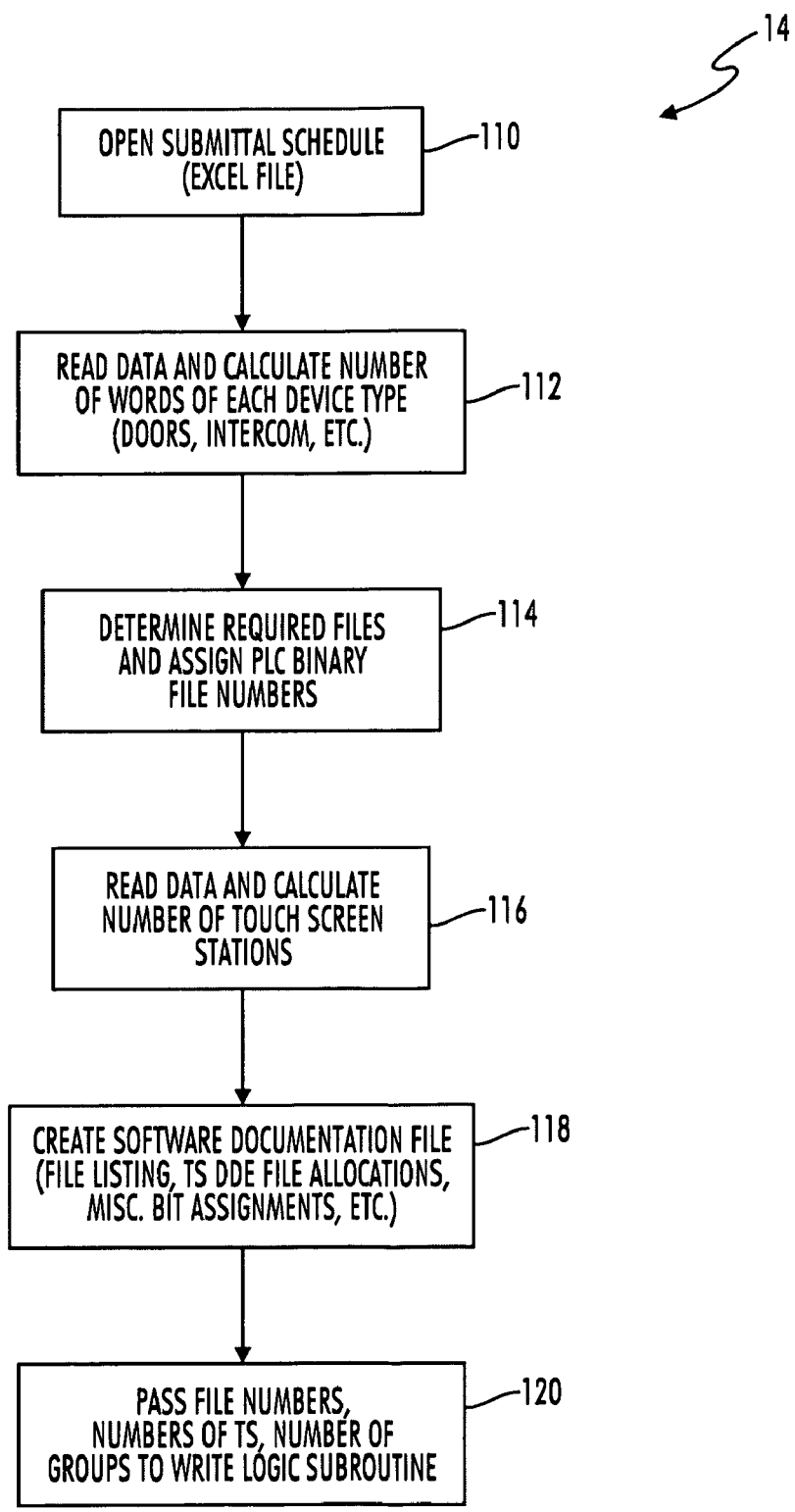
FIG. 2 illustrates a flow chart of a Read Submittal subroutine of the program for reading a Submittal Schedule of the program, both illustrated in FIG. 1.

Program execution begins at step 20, Get Submittal Schedule, as illustrated by the main data flow diagram of the program 10 illustrated in FIG. 1. The user has two options. The first is to press the Find Submittal button and the second is to press the Write PLC Program button. If the user chooses the Find Submittal button, the program flow proceeds to step 22 where the program 10 determines whether the Submittal Schedule 12 exists. If the Submittal Schedule 12 does not exist, the program flow is returned to Get Submittal Schedule step 20. Before proceeding further, the user should work with the customer and the customer information to create the Submittal Schedule 12. If, however, the Submittal Schedule 12 has already been created the program flow proceeds to the Read Submittal subroutine 14. The data flow chart for the Read Submittal subroutine 14 is illustrated in FIG. 2 and is described in more detail below. Generally, however, the Read Submittal subroutine 14 opens, reads, and analyzes the Submittal Schedule 12 and transfers data to a database 18 where project information is stored in variables. Once the Read Submittal Subroutine 14 has been executed, the program flow returns to the starting point at step 20, Get Submittal Schedule.

The second option the user has is to press the Write PLC Program button. If the user presses the Write PLC Program button, the program flow moves to step 24 where the program 10 determines whether the Submittal Schedule 12 has been read. If the Submittal Schedule 12 has not been read, the program returns to Get Submittal Schedule step 20.

The user should press the Find Submittal button in order for the program 10 to proceed to the Read Submittal subroutine 14, as described above, to read the Submittal Schedule 12. If, however, the Submittal Schedule 12 has already been read, the program flow proceeds to the Write PLC Logic subroutine 16. The Write PLC Logic subroutine 16 is illustrated in FIGS. 3–8 and is described in more detail below. Generally, however, data flow is transferred between the Write PLC Logic subroutine 16 and database 18 and between subroutine 16 and the Submittal Schedule 12, as illustrated in FIG. 1. The data and information stored in database 18 and Submittal Schedule 12 are used by the Write PLC Logic subroutine 16 to create the PLC logic or code for controlling and automating a specific security system facility for the particular customer whose information is contained within Submittal Schedule 12.

Referring now to FIG. 2, the Read Submittal subroutine 14 of the program 10 begins with step 110. Step 110 of the Read Submittal subroutine 14 opens the Submittal Schedule 12 using Excel Application Object. Next, the subroutine 14 proceeds to step 112, where the data in Submittal Schedule 12 is read and the number of words of each device type (such as doors, intercom, etc.) is calculated. The program 10 searches for keywords in the Submittal Schedule 12 such as "Tag Number", "Input Point", and "Output Point". The program 10 then records the locations of these cells for use later in the program by accessing the Excel Application Worksheet Function Object. The Object gives the program 10 access to all of the Excel Functions, such as, for example, SUM, MAX, MIN, FIND, and REPLACE, available to the spreadsheet.

Step 114 of the subroutine 14 determines the required files and assigns each file a PLC binary file number. Next, step 116 reads the data and calculates the number of touchscreen stations, such as the touchscreen illustrated in FIG. 9. Step 118 then creates a software documentation file including the file listing, TS DDE file allocations, miscellaneous bit assignments, etc. Finally, step 120 of subroutine 14 passes the file numbers, the number of touchscreens, and the number of groups to database 18. Database 18 is read by the Write PLC Logic subroutine 16, which is illustrated in FIGS. 1 and 3 and is described in more detail below.

Once all the sheets in the Submittal Schedule 12 have been read and analyzed, the program 10 returns the information that it has obtained. This includes, for example, the number of touchscreens, and the quantity of each device type. The user then has the opportunity to change any of these quantities. For example, the user may want to increase the number of certain devices to provide room for future facility expansion or spare devices. When the user is satisfied with the quantities, the user presses the Write PLC Program Button to write the software for automating and controlling the customer's facility.

As stated above, the Write PLC Logic subroutine 16 writes the software program needed for automating and controlling a particular system. To write the software, the subroutine 16 uses both the Excel Application Object and the RSLogix Objects. Like most COM-based applications, RSLogix has multiple objects that can be accessed from Visual Basic. All of the objects in RSLogix are used to create the PLC software. The application object is used to interface with all other objects either internal to RSLogix or external, such as Excel.

Figure 3:
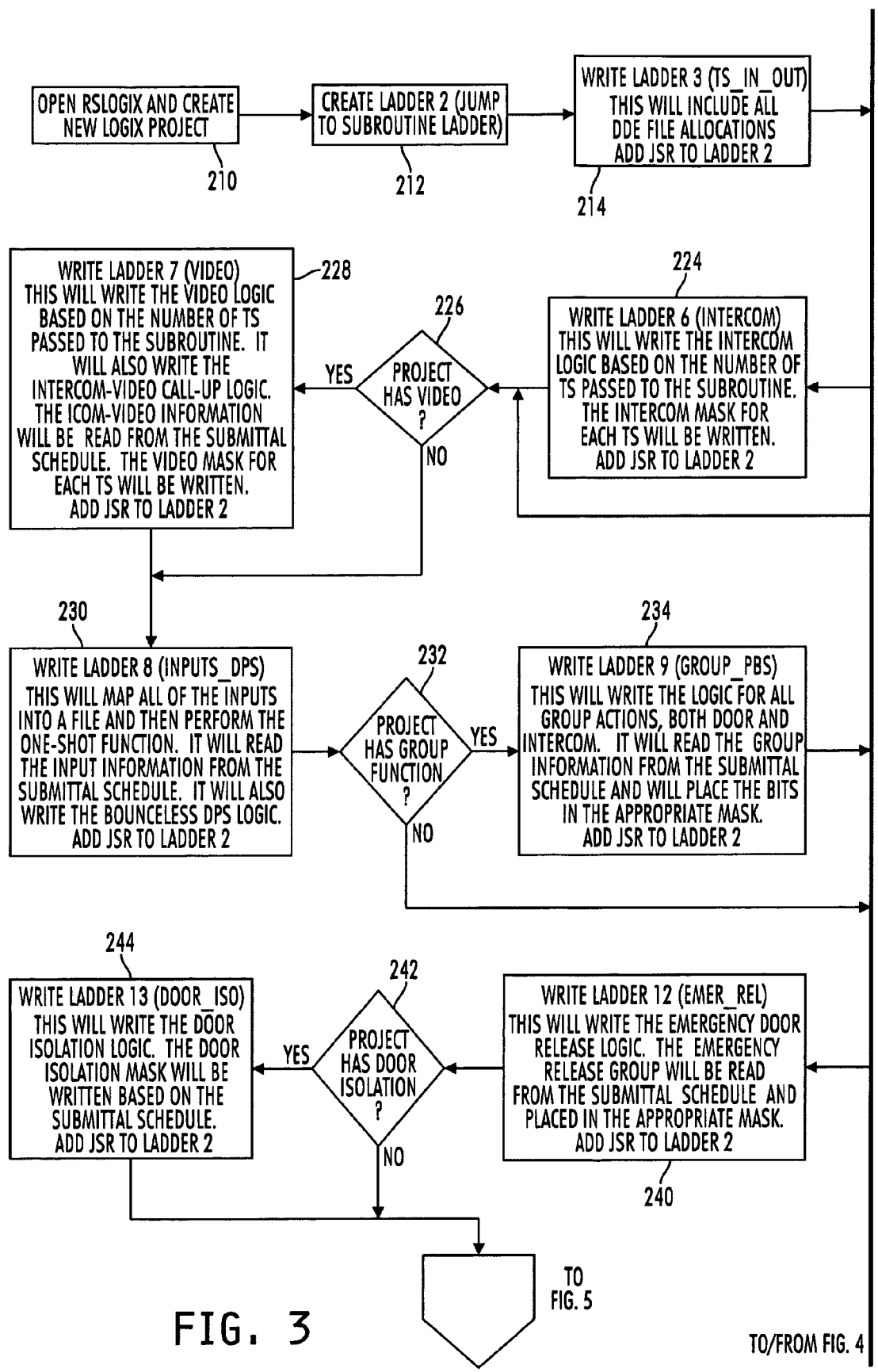
FIGS. 3–8 illustrate portions of a flow chart which, when combined, illustrate a Write PLC Logic subroutine, illustrated in FIG. 1, for writing the software for the PLC using output information from the Read Submittal subroutine illustrated in FIG. 2.

As illustrated in FIG. 3, the Write PLC Logic subroutine 16 of program 10 opens an instance of RSLogix, as illustrated by step 210. Based upon program size and I/O requirements, RSLogix names the file and selects the appropriate PLC. RSLogix determines which pieces of logic are required for a specific job. RSLogix then compiles a list of PLC data files that are necessary for operation. This list will change from job to job depending upon the size and scope of the job. Each list is kept in a new Excel Spreadsheet or database 18, as illustrated in FIG. 1.

After step 210, subroutine 16 of the program 10 begins to write the logic necessary to make the job operate as planned. The program 10 only writes the code that is required for the particular job on which it is operating. For example, if the Watch Tour function is not required for the job, the program 10 will not add the Watch Tour logic. The subroutine 16 creates ladder 2, as illustrated by step 212, to control the flow of the subroutine 16. The subroutine 16 then creates all of the additional ladders necessary to facilitate system operation. While creating the other ladders, the subroutine 16 accesses the Submittal Schedule 12 and retrieves all of the necessary information such as the number of devices, the specific I/O information and the Tag Number, for example. Once this information has been retrieved and is in place, the program 10 inserts an algorithm for that particular Ladder using the PLC Data File numbers assigned previously. This step is repeated for each Ladder.

The creation of the other Ladders will now be described. In step 214, Ladder 3 is written. Ladder 3 includes all the DDE File Allocations. Step 214 further includes adding Ladder 3 to Ladder 2 of step 212, which, as mentioned above, controls the flow of the subroutine 16. In step 216, the subroutine 16 branches to either step 218 or 220 depending upon whether the information submitted on the Submittal Schedule 12 for the project indicates the project has a Quick Comm feature or does not have this feature. This feature, also known as the Communication operation or feature, establishes audio communications from the control panel when a user presses a Communications Icon Button at the location of an intercom station within the facility. A Communications Icon Button exists for each intercom or staff station. The audio is connected to the remote station and video cameras viewing that area are displayed on the "Spot" monitor near the touchscreen. The images produced by the cameras are displayed on Alarm Convenience Monitor(s). If no camera is viewing a particular location, audio is connected without video. Pressing the Communications Icon again cancels the call. Also, connecting to another station will automatically cancel the previous connection. Pressing a Press To Talk Icon permits the operator to talk to the station. The Communications Icon Button is used to show the state of the intercom call. If a user presses the call icon located on the staff or inmate intercom station, and the call has not been acknowledged, the Communications Icon Button flashes green and the DVI sounds a digitized telephone ring until the call is connected or the user presses a Silence button (as will be discussed later). If the call has been answered, the Communications Icon Button is solid green, and all cameras called up to follow the intercom are solid green as well. If another call is incoming while the first is being serviced, that Communications Icon Button flashes and the DVI will softly annunciate the ringing telephone.

The Quick Comm feature also includes a Communications Window. This window contains a Pending List containing the text names of at least seven incoming pending calls, an Active Station containing the text name of the active intercom call, a Call Answer button, a Call Answer and Zoom button, a Zoom Active button, and a Call Disconnect button. The Communications Window pertains to every call assigned to the touchscreen station and is not exclusive to the intercom stations shown on the current active screen. The Communications Window permits the operator to answer calls without requiring the operator to go to a particular screen.

If the project has the Quick Comm feature, the subroutine 16 proceeds to step 218 where Ladder 4 is written. Ladder 4 includes all the Quick Comm Logic for all touchscreens. It also writes the Wonderware® screen intercom masks based on the Submittal Schedule 12. Finally, a Jump to SubRoutine (JSR) Ladder 4 is added to Ladder 2.

Once Ladder 4 is added, or if the project does not have the Quick Comm feature, the subroutine 16 proceeds to step 220 where Ladder 5 is written. Ladder 5 includes all logic required for the Alternate Action function. The outputs of the Alternate Action function are mapped in step 220 as needed. Ladder 5 is then added to Ladder 2. The Alternate Action function is used to turn bits on and off in the PLC program. The Alternate Action function plays a critical role in the PLC program. The basic concept of the Alternate Action can be related to a push button toggle switch. For example, if one pushes a button and the device the button controls is off, then the device turns on. Likewise, if the device is on, pushing the button will turn the device off. The Alternate Action function is made up of several data files in the PLC: an input file, an output file, and intermediate files. When a bit in the input file is turned on, the bit that corresponds to that input bit in the output file is toggled on or off depending upon its current state. There is only one input file and only one output file for a single PLC program.

In step 222, the subroutine 16 branches to either step 224 or 226, depending upon whether the project has an intercom system. If the project includes the Intercom feature, the subroutine 16 proceeds to step 224 where Ladder 6 is written. Here, the logic for controlling the intercom system is written based on the number of touchscreens passed to the subroutine 16. The intercom mask for each touchscreen is also written. Finally, a JSR Ladder 6 is added to Ladder 2. If the project does not have an intercom system, or once JSR Ladder 6 is added to Ladder 2, the subroutine 16 proceeds to step 226.

In step 226, the subroutine 16 branches to either step 228 or step 230, depending upon whether the project has a Video System feature. If the project has a Video System feature, subroutine 16 proceeds to step 228 where Ladder 7 is written. The video logic is written based on the number of touchscreens passed to the subroutine 16. Establishing video Closed Circuit TeleVision (CCTV) communications from the control panel is accomplished by pressing a Video Icon Button. Pressing the Video Icon Button on the touchscreen at the location of the camera will cause the button to be solid blue and the CCTV image to be displayed on Video Convenience Monitor(s). Pressing that Video Icon Button again cancels the video and returns the button to its normally gray state. Pressing a different Video Icon Button will cause that camera to be active and will cancel any others. Step 228 also writes the Intercom-Video Call-Up Logic. The Intercom-Video information is read from the Submittal Schedule 12. The video mask for each touchscreen is also written. Finally, JSR Ladder 7 is added to Ladder 2.

Once JSR Ladder 7 is added to Ladder 2, or if the project does not have the Video System feature, the subroutine 16 proceeds to step 230 to write Ladder 8 in order to map all of the inputs into a file and then perform a One-Shot function. The One-Shot function is used to control the number of times a certain bit is turned on in the PLC program. The One-Shot function is often performed on a file or set of bits in the PLC. The One-Shot function prevents a bit that triggers an event from being scanned multiple times. For example, if the bit that triggers an event is on for multiple scans of the program, the event will get triggered every scan. To keep this from happening, the One-Shot function of the trigger bit which has turned on will be on for one scan and then will turn off. This One-Shot bit will not turn back on until the trigger bit turns off and then back on again. The One-Shot function is used in nearly all of the operational functions of the PLC program.

Step 230 reads the input information from the Submittal Schedule 12 and also writes the logic for a Bounceless Door Position Switch (DPS) function. The Bounceless DPS function used to de-bounce a switch for various functions which tend to bounce before reaching a steady state position. For example, doors in most facilities that are monitored by the program 10 use mechanical switches to indicate if the door is open or closed. When these switches are switched from open to closed they may have a tendency to bounce open and closed several times before reaching the steady state closed position. This bouncing can cause the PLC program to trigger a Door Violation function (discussed below). In other words the PLC program will think the door is open when it is actually closed. To prevent the Door Violation function from being triggered, the inputs that are connected to the door switches are de-bounced. Finally in step 230, JSR Ladder 8 is added to Ladder 2.

In step 232, the subroutine 16 branches to either step 234 or step 236, depending upon whether the project has a Group function. The Group function permits a control procedure such as Unlock, Hold Open, Stop, Local Access, and Isolate, for example, to be performed on a predetermined group of devices. The system designer defines the groups during a submittal phase of the project when Submittal Schedule 12 is created. There can be many separate groups, depending upon the layout of the facility. Typically, these groups are made of cell doors that open into the same pod or dayroom, for example. A button is assigned to each group for executing the operation desired.

If the project has the Group function, the subroutine 16 proceeds to step 234 to write Ladder 9. Step 234 writes the PLC logic for all the Group functions or actions designated for both the door and the intercom systems. Step 234 reads the group information from the Submittal Schedule 12 and places the bits in the appropriate mask. Finally, a JSR Ladder 9 is added to Ladder 2.

Figure 4:
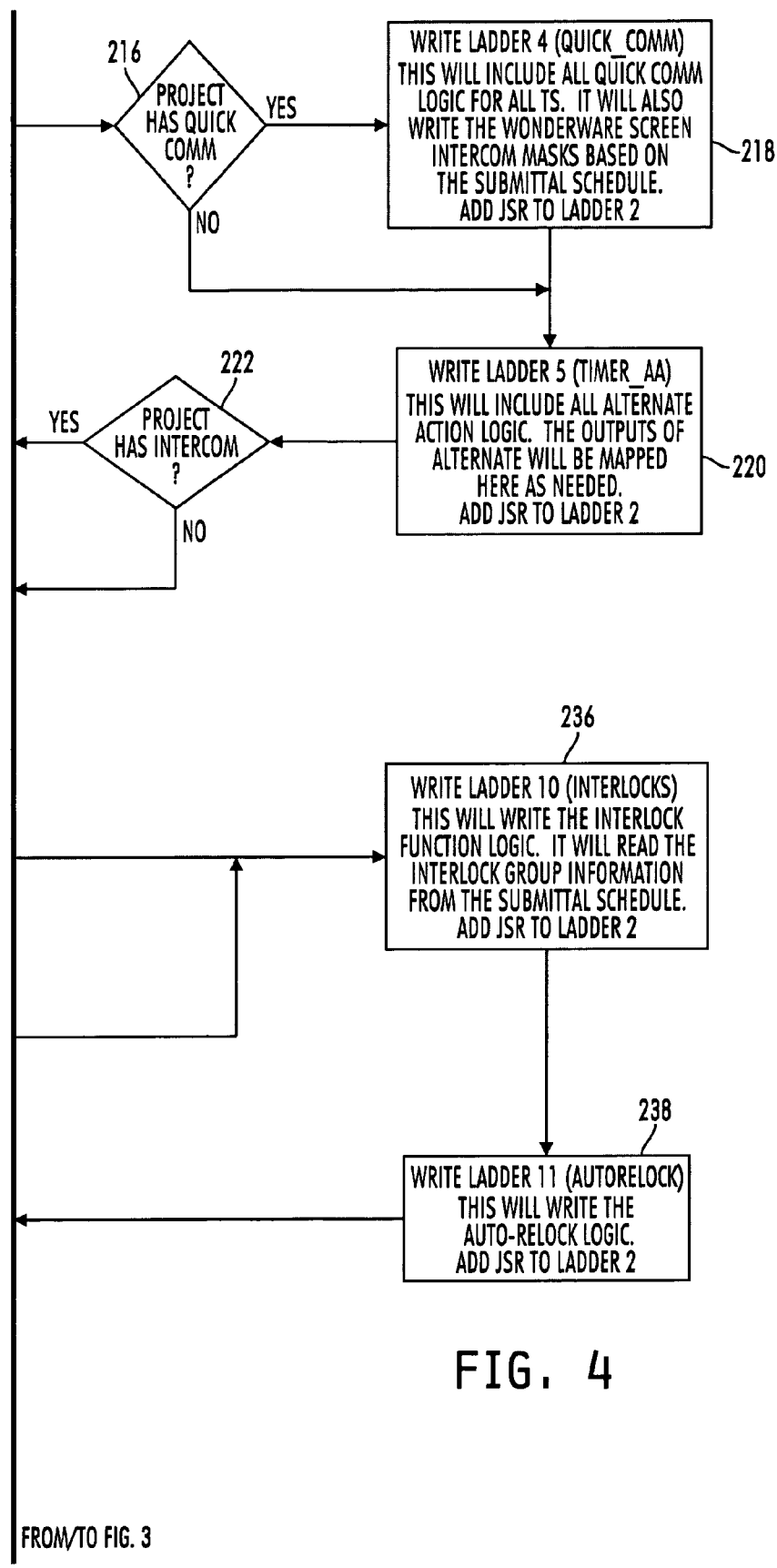

Once JSR Ladder 9 is added to Ladder 2, or if the project does not have the Group function, subroutine 16 proceeds to step 236, as illustrated in FIG. 4. In step 236, Ladder 10 is written. Step 236 writes the logic for an Interlock function and reads the Interlock group information from the Submittal Schedule 12. The logic written by the Interlock function controls the operation of the individual hardware sets where two or more doors with electric hardware form a sallyport, or where interlocks between hardware sets are indicated on the plans or specifications, or are specified by the designer at the time of submissions for the Submittal Schedule 12. A sallyport is an area in a building that is provided with two doors controlling access to the area from two different locations. In a detention facility, for example, one purpose of a sallyport is to maintain a secured door between, for example, the exterior and interior of the facility. The operation of the individual hardware which controls the sallyports is as follows. A yellow background behind the icon illuminates when any other door of the interlocked group is unlocked or unsecured, including primary or secondary control icons. This permits both the Central Control and the Local touchscreen to be aware of the status of all doors when one door of the sallyport is controlled by the Central Control and the other door is controlled by the Local touchscreen. The controls permit only one of the hardware sets to be in the non-secured condition at any given time unless the interlock bypass function is activated. The operator must press the interlock override icon prior to unlocking a door, via the Unlock icon in the Door Control menu area (described above), to defeat the interlock.

Many safety features can attend the interlock override feature. For example, when the interlock override icon is pressed, a yellow pop up message box is displayed with a written warning and the DVI warns the operator of the danger associated with interlocks. The DVI warning must play in its entirety before the first level confirmation icon is displayed. A second and larger yellow interlock override warning box then appears with a written warning. A second DVI warning must play in its entirety as well before the second level confirmation is displayed. Only after the second confirmation is made are the interlock indications removed from the screen. Once any door icon is pressed, the interlock override function is cancelled. If no door icons are pressed within, for example, ten seconds of the second confirmation, the interlock override function is cancelled. The interlock override function can also be canceled at any time by pressing the Cancel icon. Once the interlock logic to perform these functions is written, a JSR Ladder 10 is added to Ladder 2.

In step 238, Ladder 11 is written. Ladder 11 is the logic for a Auto-Relock function. The Auto-Relock function acts to automatically lock doors which have been unlocked by removing power from the door locks to secure the door. For example, a facility can be equipped with several types of doors. These doors include, but are not limited to, doors that swing open and closed on hinges, doors that slide open and closed automatically by way of a motor, and overhead doors. Doors that are controlled by motors and doors that swing on hinges typically have locks that are located in their respective doorframes or in the doors themselves. When the system 10 is told to unlock a door, power is supplied to the lock and the lock unlocks. After several seconds, the Auto-Relock function removes power from the lock, and the door is again secured. The Auto-Relock function usually only applies to swinging doors, but can be implemented on any type of door, depending upon what the facility requires. The Auto-Relock function can also be bypassed by using a Hold Open function of the touchscreen. The Hold Open function includes the PLC logic necessary to perform the task of bypassing the Auto-Relock function. Finally, step 238 adds JSR Ladder 11 to Ladder 2.

Looking again to FIG. 3, step 240 of subroutine 16 writes Ladder 12, the logic that controls an Emergency Door Release function. An emergency release group of doors is read from the Submittal Schedule 12 and placed in the appropriate mask. In general, the Emergency Door Release function is located on selected touchscreens as an icon labeled Emergency Door Release. After the operator presses the icon, the operator is permitted to page through all screens to see which doors are to be unlocked. After a third confirmation is pressed by the operator, all doors of the specified route will open. The operation can be canceled at any time by pressing the Cancel button. Once the logic to perform the Emergency Door Release function is written, step 240 adds a JSR Ladder 12 to Ladder 2.

In step 242, the subroutine 16 branches to either step 244 or step 246, depending upon whether the project has a Door Isolation function. If the project has the Door Isolation function, the subroutine 16 proceeds to step 244 to write Ladder 13, the logic for the Door Isolation function. The Door Isolation function isolates electrically controlled doors, or doors that are also controlled by field mounted access devices, to prohibit the doors from normally being opened. The operator first selects an Isolate Door feature from the touchscreen and then presses the Door Icon Button depicting the door to isolate. Other doors may be commanded to become isolated by pressing other Door Icon Buttons within three seconds of the first. After three seconds, the Isolate command cancels. Repeating the process on an isolated door reverses the condition and returns the door to group or keypad control. Isolating a door that has been granted inmate access will automatically turn off the inmate access. Door Isolate Indicators include the Door Icon Button which has a yellow "X" marked through it indicating that the door cannot be unlocked. Step 244 also writes the Door Isolation mask based on the Submittal Schedule 12. Step 244 also adds a JSR Ladder 13 to Ladder 2.

Figure 5:
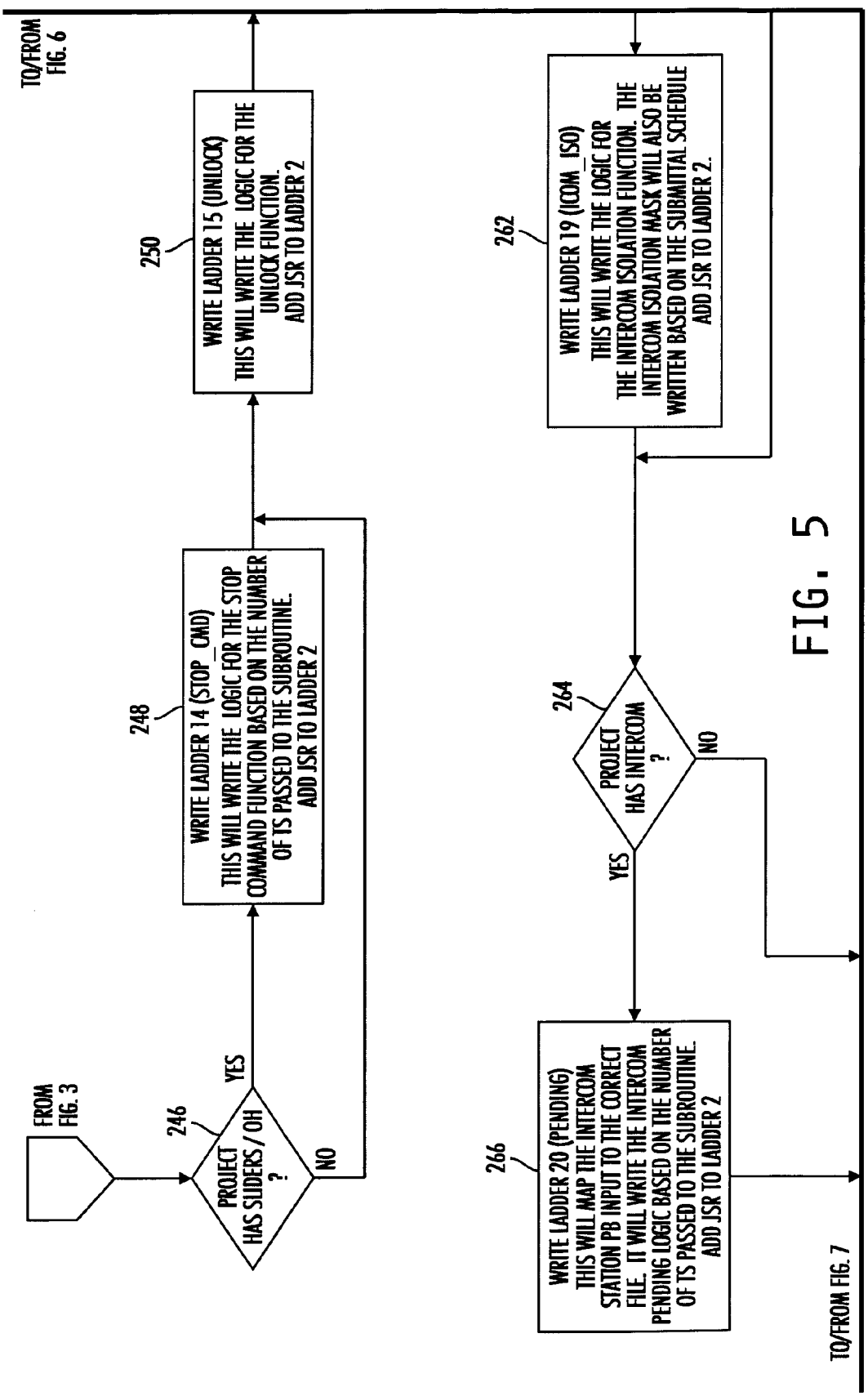

Once Ladder 13 has been added to Ladder 2, or if the project does not have the Door Isolation function, the subroutine 16 proceeds to step 246, illustrated in FIG. 5. In step 246, the subroutine 16 branches to either step 248 or step 250, depending upon whether the project has sliding or overhead doors or not. The sliding and overhead doors are electronically controlled by the program 10. If the project has sliding or overhead doors, the subroutine 16 proceeds to step 248 to write Ladder 14. Ladder 14 is the logic for a Stop Command function and is based on the number of touchscreen passed to the subroutine 16. The Stop Command function is provided to permit the user to stop the operation of any of the sliding or overhead doors. Step 248 also adds a JSR Ladder 14 to Ladder 2. Once JSR Ladder 14 has been added to Ladder 2, or if the project does not have sliding or overhead doors, the subroutine 16 proceeds to step 250 to write Ladder 15. Ladder 15 is the logic for the Unlock function. An unlock function button is provided on the touchscreen for a user to press in order to unlock any of the electronically controlled sliding or overhead doors by pressing the Door Icon button for each of the doors to be unlocked. Step 250 also adds a JSR Ladder 15 to Ladder 2.

Figure 6:
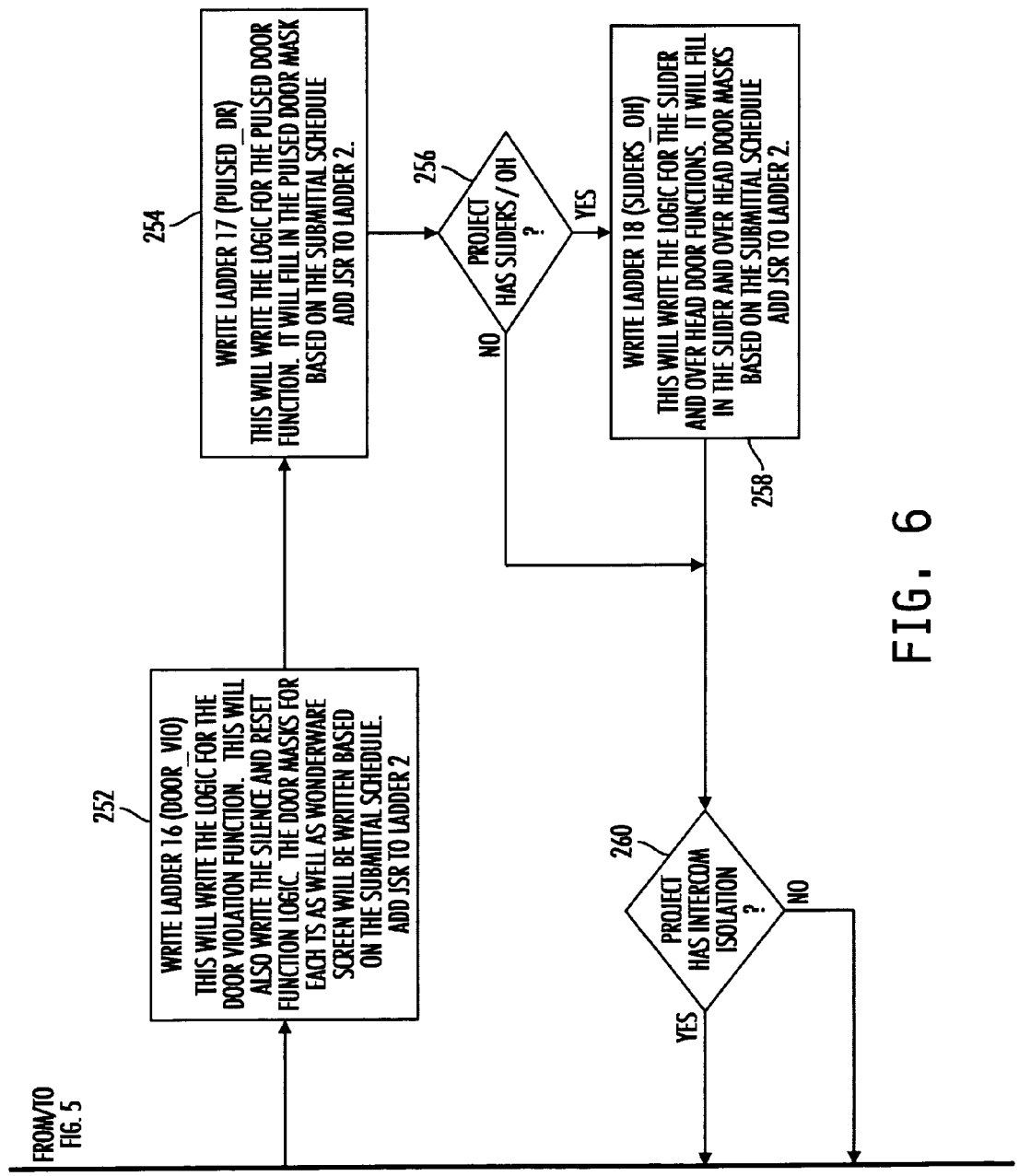

Next, the subroutine 16 proceeds to step 252, illustrated in FIG. 6, to write Ladder 16. Ladder 16 creates all of the PLC logic necessary to implement the operation of the Door Violation system. Ladder 16 also includes the logic for the Silence and Reset functions. A door violation is defined as any time a monitored door in a facility is opened by a means other than the PLC. The Door Violation function informs the operator of the door violation. Further, Ladder 16 includes the logic for each touchscreen as well as each Wonderware® screen, both of which are written based on the Submittal Schedule 12. The Silence function is provided through a touchscreen control. Pressing this icon silences the audible annunciators used to indicate a violated door, staff station request or any other alarm. A touchscreen control is also provided for the Reset function. Pressing this control cancels any door violation condition and/or any active menu. The Reset function does not affect communications calls. Finally, step 252 adds a JSR Ladder 16 to Ladder 2.

Subroutine 16 then proceeds to step 254 to write Ladder 17. Ladder 17 is the logic for a Pulsed Door function. The Pulsed Door function acts to lock or unlock doors in the following manner. A facility may have varying types of locks on swinging doors. The types of locks can include, but are not limited to full-cycle, half-cycle, and solenoid. A full-cycle lock is operated by power supplied to the lock for only a brief moment or "pulse". The internal components of the lock cause the motor in the lock to rotate a movable component of the lock a full 360 degrees (full cycle). This motion causes the bolt in the lock to retract and then extend again if there is not a mechanical device internal to the lock that permits the motor to run but the bolt to remain retracted. A half-cycle lock is operated by power which is applied and maintained on the unlock wire of the lock that causes the motor to run 180 degrees (half cycle) until it reaches an internal limit switch which cuts off the power to the motor. When the power is cut, the bolt is retracted. The door locks when power is removed from an unlock wire and applied to a relock wire on the lock causing the motor to continue to travel the remaining 180 degrees to cause the bolt to extend. A solenoid lock is operated by supplying a pulse of power to the lock to move the solenoid. Ladder 17 of the program 10 writes the PLC logic necessary to implement the pulse of power needed to unlock a full-cycle door as well as any other control functions unique to full-cycle locks. Ladder 17 fills in the Pulsed Door Mask based on the Submittal Schedule 12. Step 254 also adds a JSR Ladder 17 to Ladder 2.

In step 256, the subroutine 16 branches to either step 258 or step 260, again, depending upon whether the project has sliding or overhead doors. If the project includes sliding and overhead doors, the subroutine proceeds to step 258 to write Ladder 18. Ladder 18 is the logic for controlling how long power is to be applied to sliding and overhead doors while such doors are opening and closing by using timers to control the duration of the door travel. In addition to controlling the timing of the sliding and overhead door motion, the Ladder also contains the Logic for a Dwell Timer function. The Dwell Timer function is used when the travel of a sliding or overhead door is reversed while the door is in motion. When this occurs, the momentum of the door causes the motor to continue rotating. If power is applied to change direction when this occurs it can damage the motor or the connection of the motor to the door. To prevent this, a pause is placed between the open and close commands to permit the door to stop moving. This pause is known as the Dwell. Step 258 fills the Slider and Over Head Door Masks based on the Submittal Schedule 12. Finally, step 258 adds a JSR Ladder 18 to Ladder 2. Once JSR Ladder 18 has been added to Ladder 2, or if the project does not have sliding or overhead doors, the subroutine 16 proceeds to step 260.

In step 260, the subroutine 16 branches to either step 262 or step 264, both illustrated in FIG. 5, depending upon whether the project has an Intercom Isolation function. The Intercom Isolation function permits the operator to shut off an intercom station so no audible incoming calls are received. Pressing an Isolate icon opens a three second window, whereupon any intercom station turned off or isolated is shown as a gray icon. An active intercom station is shown as a solid green icon. Pressing the icon on the graphic control panel at the intercom station alternates its state between off (isolated) and on. An isolated intercom station is still accessible by the operator via Communicate and Audio features. An Isolated intercom still visually annunciates. Only the ringing chime is suppressed. The Communications Icon Button has a yellow "X" marked through it indicating that the intercom station has been isolated. If the project does have the Intercom Isolation function, the subroutine 16 proceeds to step 262 to create all of the PLC logic necessary to implement the operation of the Intercom Isolation function. Step 262 writes the Intercom Isolation Mask based on the Submittal Schedule 12. Further, step 262 adds a JSR Ladder 19 to Ladder 2.

Once JSR Ladder 19 has been added to Ladder 2, or if the project does not have the Intercom Isolation function, the subroutine 16 proceeds to step 264. In step 264, the subroutine 16 branches to either step 266, illustrated in FIG. 5, or step 268, illustrated in FIG. 7, depending upon whether the facility has an intercom system. If the project has an intercom system, the subroutine 16 proceeds to step 266 to write Ladder 20. Ladder 20 is the PLC logic for an Intercom Pending function, and is written based on the number of touchscreens passed to the subroutine 16 from Submittal Schedule 12. The Intercom Pending function permits the monitoring of intercom stations whose call buttons have been pressed. A pending intercom is an intercom station whose call button has been pressed, but has not yet been connected for communication. Ladder 20 also writes the PLC code that handles which touchscreens will receive the Pending Intercom call. Step 264 also maps the Intercom Station Push Button Input to the correct file. Each intercom station that is positioned throughout the facility is equipped with a push button. This button is used to contact the operator of the touchscreen. These push buttons are connected to discrete input terminals on the PLC I/O cards. Each button has its own input that is monitored by the PLC. Finally, step 266 adds a JSR Ladder 20 to Ladder 2.

Once JSR Ladder 20 has been added to Ladder 2, or if the system does not have an intercom, the subroutine proceeds to step 267 to write Ladder 21. Ladder 21 is the logic for all audio path relays including paging. The paging feature permits the operator to select which paging zones are connected for a subsequent paging operation. The operator first presses a Page Icon in a More Communications menu area of the touchscreen. All paging icons are displayed on the touchscreen with those not selected displayed as gray icons and those that are selected displayed as green icons. Step 267 further maps the outputs for the Intercom relays based on the Submittal Schedule 12. Finally, step 267 adds a JSR Ladder 21 to Ladder 2.

Figure 7:
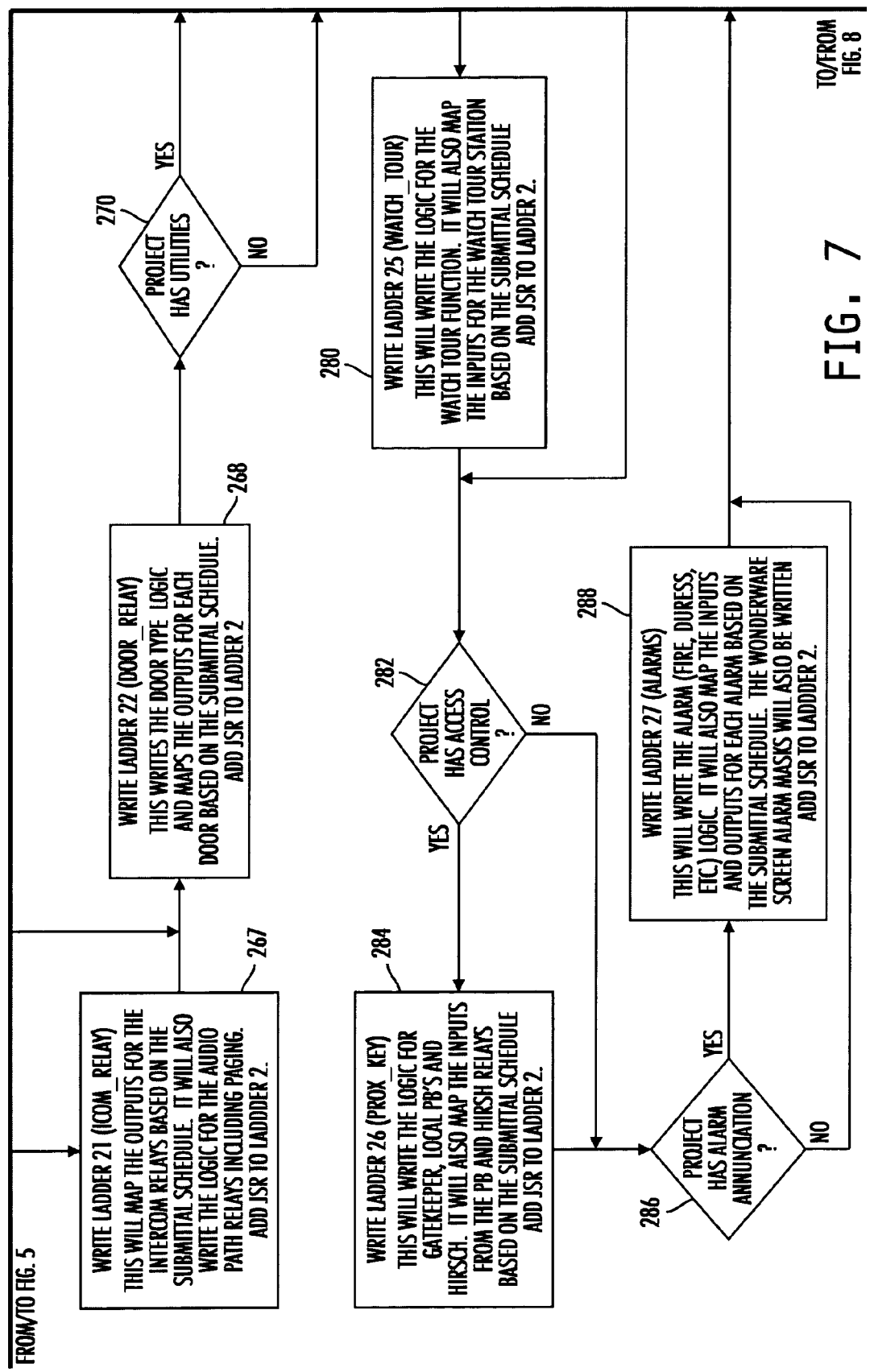

Once JSR Ladder 21 has been added to Ladder 2, or if the project does not have an intercom system, the subroutine 16 proceeds to step 268 to write Ladder 22. Step 267 also proceeds to step 268, as illustrated in FIG. 7. Ladder 22 is the logic for the Door Type function which reads and stores the types of doors of the facility. Step 268 further maps the outputs for each door based on the Submittal Schedule 12.

Figure 8:
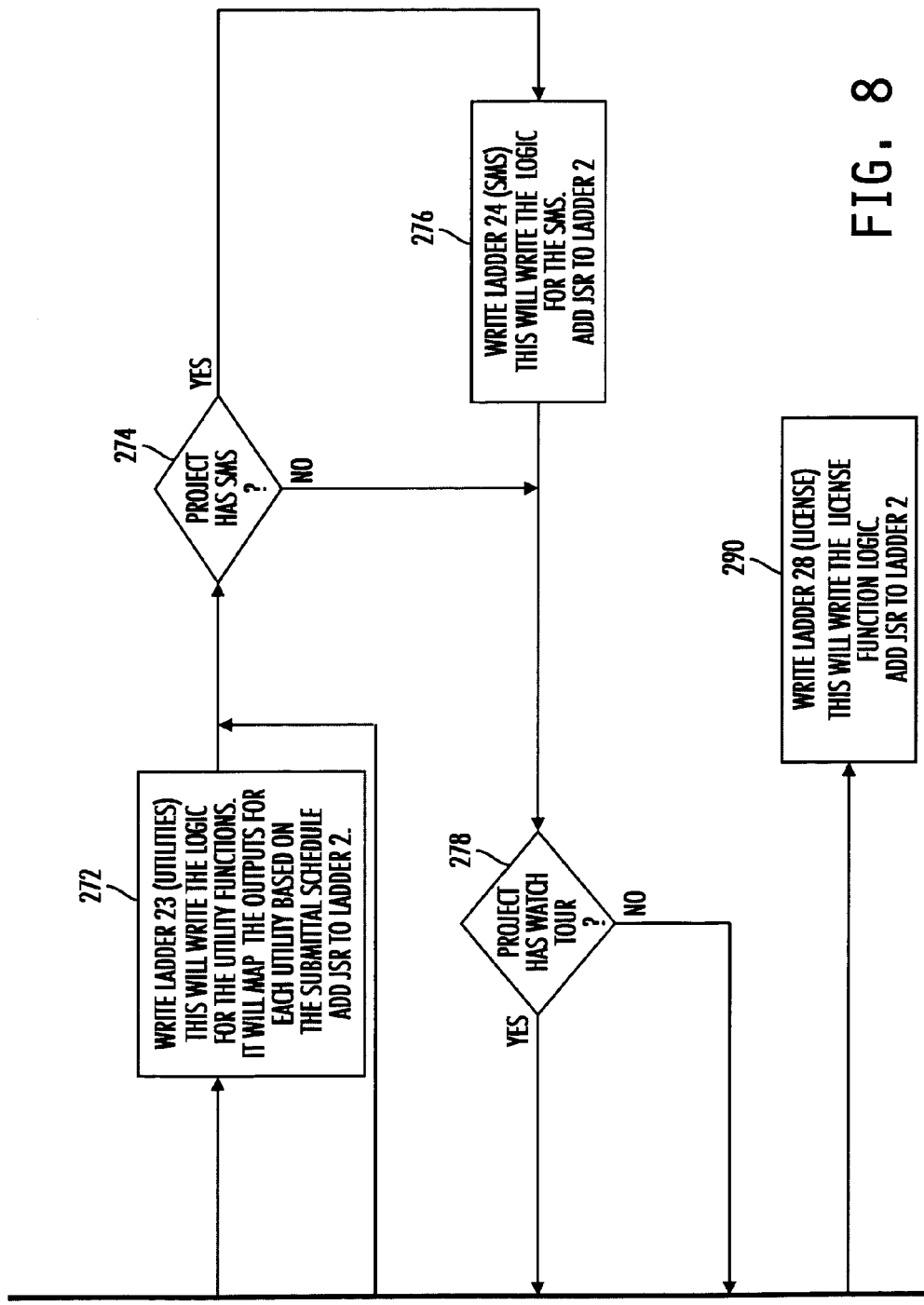

In step 270, the subroutine 16 branches to either step 272 or step 274, both illustrated in FIG. 8, depending upon whether the project has a Utilities function. If the project has a Utilities function, the subroutine 16 proceeds to step 272 to write Ladder 23. Ladder 23 is the logic for controlling the utilities functions. The Utilities Control is a hidden function. In use, the operator first selects the Utilities menu button. All utilities are then displayed graphically on the touchscreen. Three seconds after a Utility button is pressed, the Utilities command cancels. Pressing the Utility button of the utility that is to be controlled while the Utilities menu is active will cause the utility to turn off if it is on and on if it is off. Some of the utilities which are controlled include, for example, the lights, TV receptacles, inmate telephones, water solenoid valves, and exterior lighting. Step 272 further maps the outputs for each utility based on the Submittal Schedule 12. Finally, step 272 adds Ladder 23 to Ladder 2. Once JSR Ladder 23 is added to Ladder 2, or if the project does not have any utilities, the subroutine 16 proceeds to step 274.

In step 274, the subroutine 16 branches to either step 276 or step 278 depending upon whether the project has a Security Management Server (SMS) function. If the project has an SMS function, the subroutine 16 proceeds to step 276 to write Ladder 24, the logic for the SMS function. This portion of the program creates all of the PLC logic necessary to interface with SMS software. In addition to the PLC logic, this portion of the program creates the configuration files used by the SMS. These files are unique for every job and contain information like device names and locations as well as Commander™ station data. Commander™ software is a software currently in use at many security facilities for controlling the various devices within the facility. Commander™ software is available from integrator.com, Inc. headquartered at 8001 East 196$^{th}$ Street, Noblesville, IN 46060. These files translate the data that resides in the PLC to a form that is readable by the user. The SMS performs several valuable functions, but is not an essential component of any operational control system. The SMS is an IBM type personal computer connected via Ethernet to the PLC controller. The SMS records Time/Date, Device, Device Action, and user for all transactions and alarms. Transactions and alarms which are recorded include, but are not limited to, for example, door openings, closings, unlocking, relockings, secure actions, door positions, lock status, violations, violation silencing, violation resetting, interlock violations, and resetting of interlock violations. Step 276 also adds a JSR Ladder 24 to Ladder 2. Once JSR Ladder 24 has been added to Ladder 2, or if the project does not have the SMS function, the subroutine 16 proceeds to step 278.

In step 278, the subroutine 16 branches to either step 280 or step 282, both illustrated in FIG. 7, depending upon whether the project has the Watch Tour function, as described above. If the project has the Watch Tour function, the subroutine 16 proceeds to step 280 to write Ladder 25. Watch Tours are in place as a means of tracking whether or not an officer walks through the facility to supervise the inmates. Watch Tour stations are located in the facility for the officers to depress. Inputs from these stations are connected to the I/O cards of the PLC. Tours are initiated at the touchscreen with primary control over a defined area. When a local touchscreen is disabled, the touchscreen that has taken over control of that area shall be able to initiate an individual Watch Tour for that area. Watch Tour stations are hidden off the screen until a Watch Tour is initiated. Watch Tour stations then appear on the screen. Once a station is pressed, it will change from orange to gray. When a Watch Tour is initiated, a count down counter will start. If all stations in the tour are not activated prior to the end of the count down, the touchscreen will flash in red all stations that were not activated in the tour. When the Watch Tour is not active, the count down timer window is used to display the amount of time elapsed since the last successfully completed tour.

Ladder 25 is the logic for the Watch Tour function. Step 280 also maps the inputs for watch tour stations based on the Submittal Schedule 12. Further, step 280 adds a JSR Ladder 25 to Ladder 2. Once JSR Ladder 25 is added to Ladder 2, or if the project does not have the Watch Tour function, the subroutine 16 proceeds to step 282.

In step 282, the subroutine 16 branches to either step 284 or 286 depending upon whether the project has an Access Control function. If the project has the Access Control function, the subroutine 16 will proceed to step 284 to write Ladder 26, the PLC logic necessary to interface with the Access Control software. The Access Control System permits each user to be configured for each of the following: user name, proximity card ID, owner definable access groups, such as, for example, administration, jail staff, sheriff's staff, and so on, definable time groups such as, for example, first shift, second shift, third shift, and so on, assign group access to any individual door, and assign individual user access to any individual door. Step 282 also writes the PLC logic necessary to monitor and process Dry Contact Door Unlock Requests. These include, but are not limited to, Door Release Push Buttons and Hirsch Door Control relay contacts. Ladder 26 is the logic for the GateKeeper™, Local Push Buttons and Hirsch Relays. Step 284 also maps the inputs from the Push Button and Hirsch Relays based on the Submittal Schedule 12. Further, step 284 adds JSR Ladder 26 to Ladder 2. Once JSR Ladder 26 has been added to Ladder 2, or if the project does not have Access Control, the subroutine 16 proceeds to step 286.

In step 286, the subroutine 16 branches to either step 288 or step 290 depending upon whether the project has an Alarm Annunciation function. If the project does have an Alarm Annunciation function, the subroutine 16 proceeds to step 288 to write Ladder 27. Ladder 27 is the logic for the various alarms included in the program 10, such as, for example, a fire alarm, a duress alarm, and so on. Fire alarm indicators, for example, are provided on the touchscreen at the location of each fire zone within the detention envelope. The PLC is interfaced to the fire alarm system via solid state inputs and outputs to meet this requirement. Further, step 288 maps the inputs and outputs for each alarm based on the Submittal Schedule 12. Step 288 also writes the Wonderware® screen alarm masks. Finally, step 288 adds a JSR Ladder 27 to Ladder 2.

Once JSR Ladder 27 has been added to Ladder 2, or if the project does not have the Alarm Annunciation function, the subroutine 16 proceeds to step 290. Step 290 writes Ladder 28 which is the logic for a License function to write a License for the program 10. Step 290 also adds a JSR Ladder 28 to Ladder 2.

Following the creation of the Ladder Files, the system verifies that the logic or code that it has created is free of errors. The program 10 then saves the File as a ".rsp" file to a location of the customer's choice. The customer is then asked if he or she wants to load the program into the PLC. If the customer chooses to do so, the customer is then asked to connect the appropriate cables and equipment. If the customer connects the appropriate connectors and equipment, the program is loaded onto the customer's PLC. If not, the program 10 continues by creating two additional files. The first file the program 10 generates is a software file listing which includes all the files used. Also, the purpose of each file is documented for troubleshooting. This software file is output in the form of an Excel document. The second file the system generates is a Comma Delimited File (*.csv) that is used in conjunction with the Wonderware® Tag Database.

A second embodiment for a method for creating a software program 310 for automating and controlling a security system is illustrated in FIGS. 11–16. This second embodiment is generally similar to the first embodiment discussed above and illustrated in FIGS. 1–10 in that the method includes reading information about a particular job or project submitted by a customer and found within a submittal schedule or spreadsheet, and analyzing the information submitted to write an efficient program for controlling that particular customer's specific application, a security system for example. As with the program 10 described above, program 310 may be used generally to program a PLC to perform various functions outside the general scope of security systems as is described herein.

Figure 11:
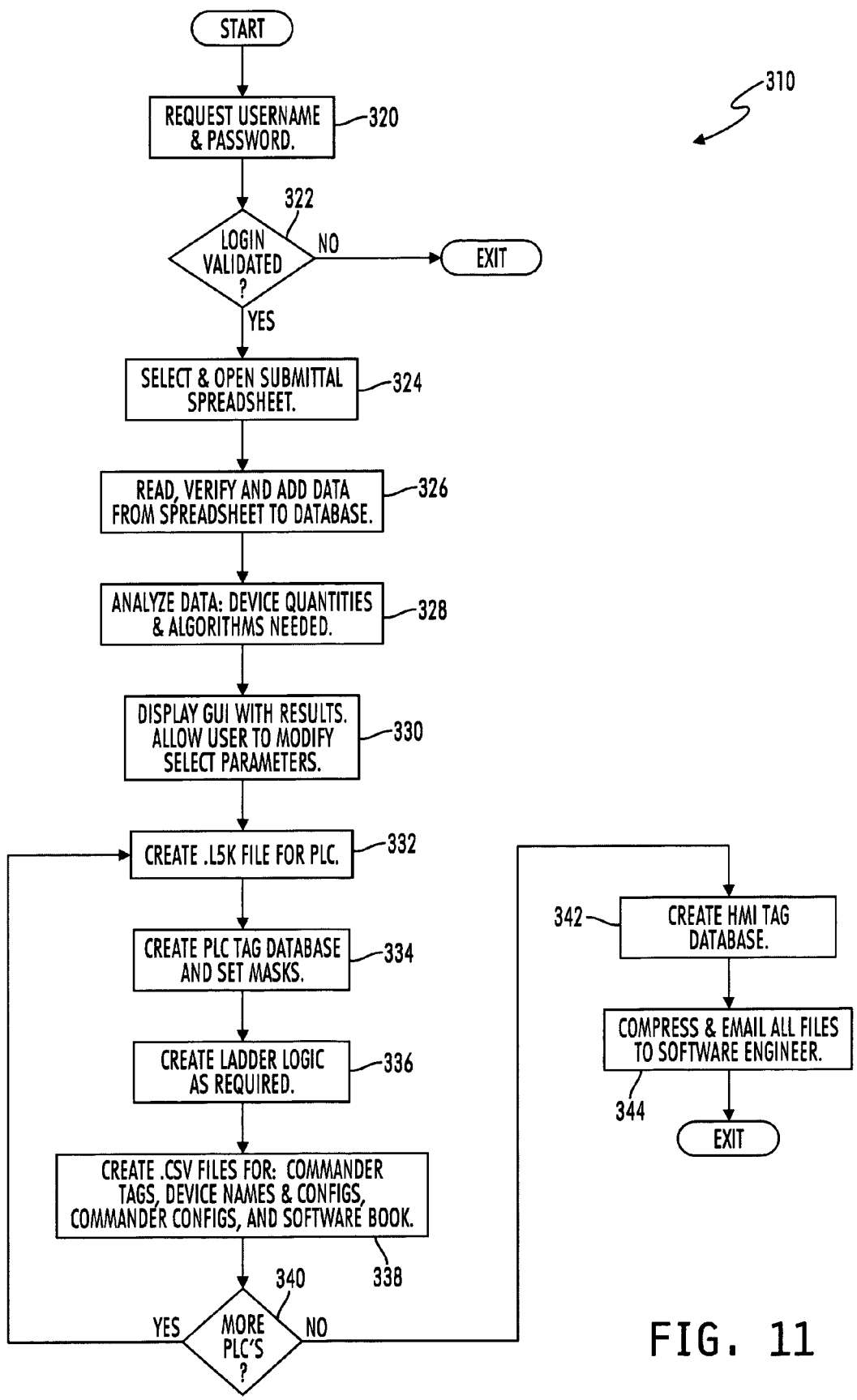
FIG. 11 illustrates a data flow diagram of the main flow of a second embodiment of the present program.

Referring to FIG. 11, execution of program 310 begins at step 320 where the user's name and password are requested. Once the user has entered his or her username and password, the program 310 then determines in step 322 whether the user's login is validated. Upon successful entry of a valid username and password, the application continues its initialization process, displays the main user interface screen, and proceeds to step 324 where the user is able to select and open a submittal schedule or spreadsheet. If the login is not validated, the user is automatically exited from the program.

As mentioned above, with respect to program 10, the submittal schedule or spreadsheet is created from information provided to the operator or user from the customer. The submittal spreadsheet may be created, for example, from specifications and drawings for a particular jobsite, such as, for example, a security facility, received from the customer. The user then enters this customer information into the submittal schedule.

Once the submittal spreadsheet has been opened in step 324, program flow proceeds to step 326 where the data in the submittal spreadsheet is opened, read, and verified. Once the data has been verified, step 326 also provides that the program then transfers the data to a database where the project information in stored. More specifically, the program 310 searches for keywords such as "Tag Number," "Input Point," Output Point," and the like in the submittal spreadsheet. The program 310 then uses these keywords to determine the location of the data that needs to be accessed and copied to the database. Before copying the data to the database, step 326 also verifies that the data is of the proper type and value range. For example, text is not allowed in a field that requires numbers, multiple numbers are not allowed in a field that requires a single number, and so on. All errors found in the submittal spreadsheet are logged and reported to the user so that they can be corrected.

Once all the data in the submittal spreadsheet has been read and copied to the database, the program 310 closes the submittal spreadsheet and moves to step 328 where the data in the database is analyzed. Analysis includes determining the information required to write the PLC logic. For example, analysis within step 328 determines the number of PLCs, the number of Commander™ stations, the number of floor plan screens, which algorithms to include, and the required quantity of each device type. The device quantities may include the number of certain operational functions required for the particular customer job for which the software is being designed. For example, the particular customer's jobsite may include a certain number of doors to be controlled by the software to lock and unlock each door upon request.

When data analysis is complete, the program 310 flow next proceeds to step 330 wherein the program 310 displays the results of the analysis on the main user interface screen. The results include, for example, the number of PLCs that particular customer needs to have reprogrammed, the number of each device type, the number of floor plan screens, which screens are accessible, the number and types of algorithms or ladders to be included, and so on. Step 330 also permits the user an opportunity to change many of the parameters which are used when writing the PLC logic before the code is written via the graphical user interface display on the main screen. For example, the user may want to increase the number of certain devices to provide room for further facility expansion or spare devices. Other parameters which can be modified by the user include, but are not limited to: the number of words of each device type per Commander™ station, the number of floor plan screens, which floor plan screens are accessible by each Commander™ station, which algorithms to include, and the number of spare words to include for the Informer™ logic. The Informer™ software is essentially a data logging application which logs all of the events that occur in the PLC such as the opening of a door or the activation of a duress alarm, for example. Informer™ software is available from intergrator.com, Inc. When the user is satisfied that the parameters accurately reflect the requirements of the job, the user presses a Write PLC Program button to initiate writing of the software for automating and controlling the customer's facility. To write the software, the program 310 uses the data gathered from the submittal spreadsheet, and any parameters which were modified by the user in step 330. The program 310 only writes the code that is required for the particular job on which it is operating. For example, if the Watch Tour function, described above with respect to program 10, is not required for the job, the program 310 will not add a Watch Tour routine or logic.

The first step in writing the PLC logic is step 332 of the main program flow illustrated in FIG. 11, creating a .L5K file. The .L5K file is a text file that contains all of the information needed by the PLC to automate and control a particular system. Basically, the information from the .L5K file is imported into the PLC. A separate .L5K file is required for each PLC, so if multiple PLCs are defined in Submittal Schedule 12, then multiple .L5K files will be created as well. Once the .L5K file is created and saved for a particular PLC, the program 310 proceeds to step 334 where the necessary PLC tags are created and device masks are set. The tag database includes information relating to the different states each device can have, for example, as described above with respect to program 10. A single .L5K file is created and completed before proceeding to the next PLC and .L5K file.

After creating the PLC tag database and setting masks in step 334, the program flow proceeds to step 336 where the program 310 creates the ladder logic required to meet the specifications of the particular customer and customer's jobsite as outlined in the submittal spreadsheet. A flowchart illustrating the process the program 310 follows to create the ladder logic is illustrated in FIGS. 12–16 and discussed in more detail below.

Once the ladder logic has been created, the program flow of program 310 proceeds to step 338 to create several ".csv" files. The first file the program 310 generates is a software tag listing which includes all the tags used. Also, the purpose of each tag is documented for troubleshooting. The program 310 also creates files that contain information related to the names assigned to specific devices as well as configuration information for both the devices and the Commander™ stations. Finally, a file is created for each Commander™ station that describes the tags necessary for the Commander™ station's operation.

Commander™ tags define the specific tag names and types needed by each Commander™ station. Device names and configurations assign an actual name to each device. For example the first door in the PLC program may be named 'A100', as specified by the customer, for example. Commander™ configurations define parameters for a particular Commander™ station such as whether or not that Commander™ station is a Central Control station and the startup floor plan to display when the computer is first run. A ".csv" file is also created for a software book which defines all of the tags and algorithms used by the PLC program to be used, for example, by the user for testing and troubleshooting. Therefore, in order to communicate with the software already in use by the customer, the software written for the PLC based on the customer's specifications must be compatible with the software already in existence, such as the Commander™ software. Although program 310 specifies the creation of Commander™ tags and Commander™ configurations, it is within the scope of this disclosure to include a program for creating software to control a system which is compatible with other software systems in use at various customer facilities besides Commander™ software.

Once the ".csv" files are created, the program 310 determines in step 340 whether there are more PLCs to be programmed. When the submittal schedule is analyzed in step 328, the number of PLCs a particular facility or customer has is determined. A single facility may have more than one PLC because, for example, either the job is too large to fit in a single PLC or because it is beneficial to distribute control among several PLCs so that if a single PLC were to stop functioning, the facility would still be at least partially functional based on the remaining PLCs.

If more than one PLC is provided in a project, the program flow proceeds back through steps 332, 334, 336, 338 and 340 for the next additional PLC. If there are no additional PLCs to be programmed, the program flow proceeds to step 342 where the program 310 creates a generic Wonderware® tag database or a human/machine interface (HMI) tag database to be used by all of the Commander™ stations. The HMI tag database is the link between the data in the PLC and the device status displayed on the Commander™ touchscreen. The HMI tag database monitors values stored in the PLC and updates the touchscreen display accordingly when these values change. For example, if an open door is subsequently closed, the PLC monitors the I/O and performs some logic to determine that the door is actually closed. The HMI tag database then registers the change in state and changes the door's icon to show the closed status. Once the HMI tag database has been created, the program 310 proceeds to step 334 wherein all of the generated files are compressed and combined into a single file which is emailed to, for example, a software engineer chosen by the user.

Figure 12:
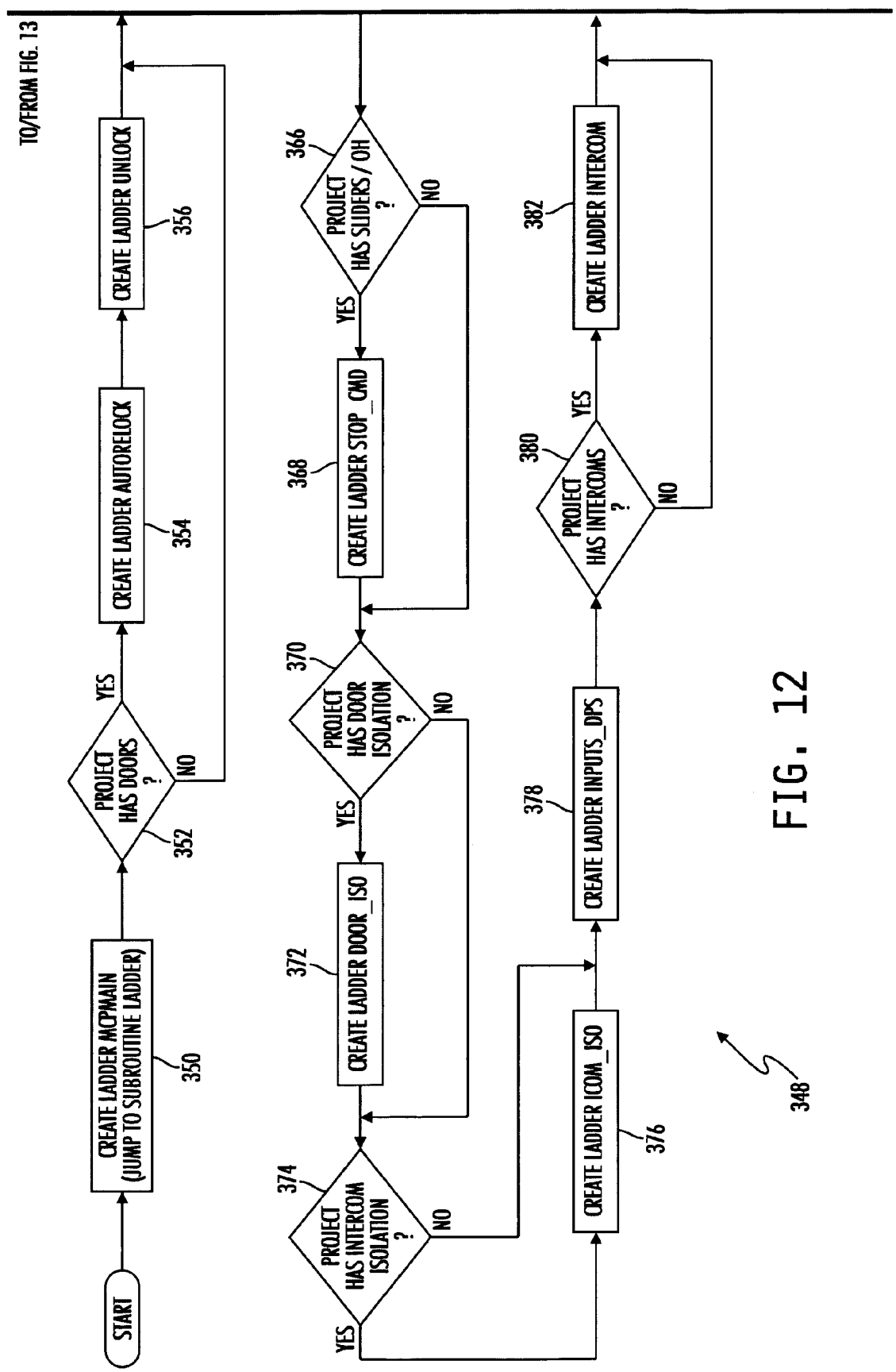
FIGS. 12–15 illustrate portions of a flow chart which, when combined, illustrate a subroutine for writing the ladder logic portion of the software for the PLC.
Figure 13:
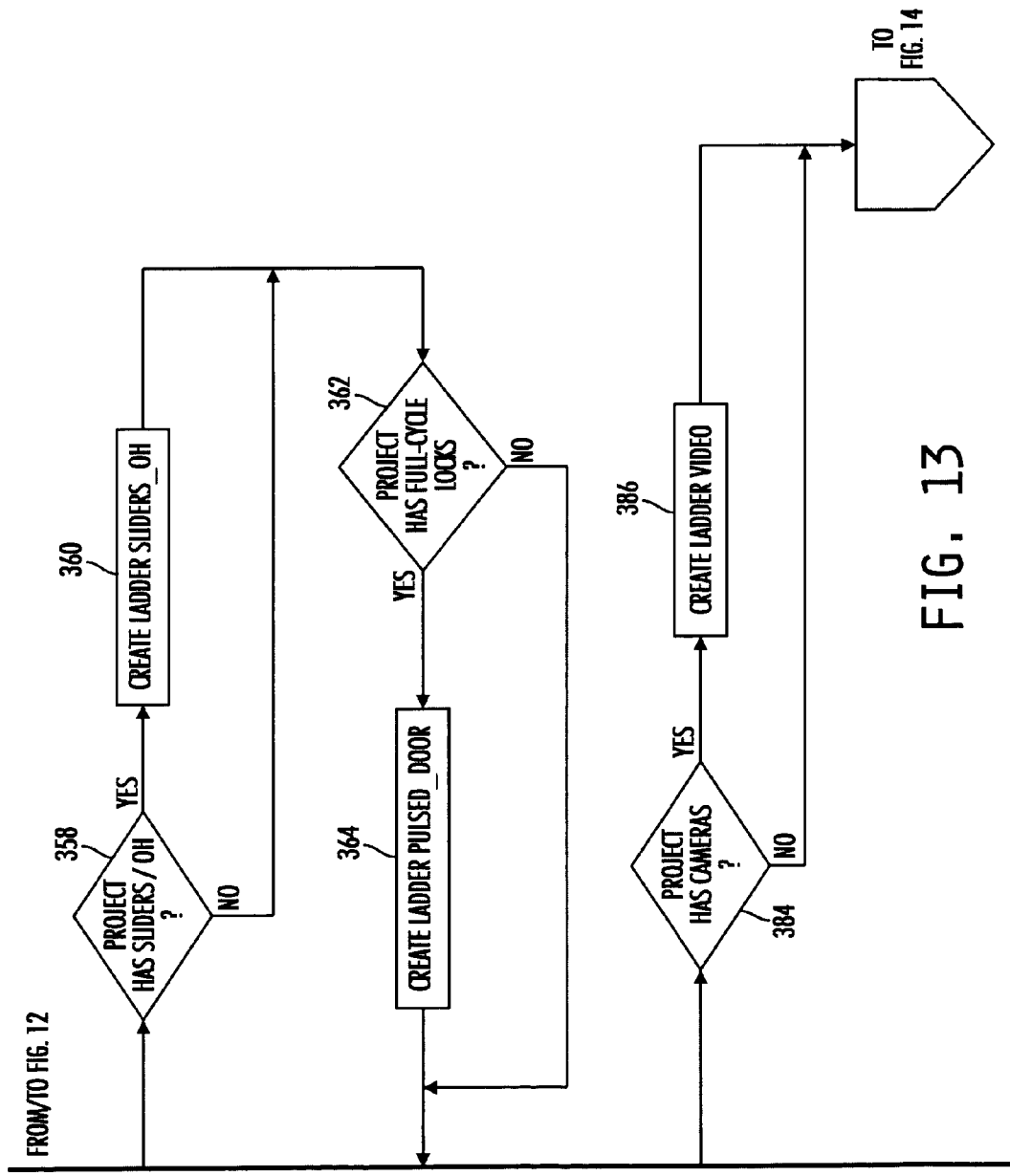

Referring now to step 336 and to FIG. 12, the ladder logic of the main program flow is created in a subroutine 348 and is outlined in more detail as follows. In a first step of the ladder logic sequence, step 350, the ladder logic subroutine creates a MCPMAIN ladder and then jumps to Subroutine Ladder. The MCPMAIN ladder controls the program flow by calling the other ladders that control the various parts of the system, discussed below, one at a time. Each ladder created is necessary to facilitate system operation of the particular customer's facility. While creating each ladder, the subroutine accesses databases established in FIG. 11 such as the database including information from the spreadsheet, the ".L5K" file, as well as the PLC tag database, for example.

Once ladder MCPMAIN has been created, the subroutine 348 proceeds to step 352. In step 352, the subroutine determines whether the project has any doors or door control. If the project does have one or more doors or door control, the subroutine proceeds to step 354 to write or create an AUTORELOCK ladder. As is discussed in more detail above, with respect to ladder 11 of program 10, the auto-relock function acts to automatically lock doors that have been unlocked by removing power from the door locks to secure the door. Once the ladder for the auto-relock function has been written, and if the facility has door control, the subroutine proceeds to step 356 to create an UNLOCK ladder. An unlock function button is provided on the touchscreen for a user to press in order to unlock any of the electronically controlled sliding or overhead doors by pressing a Door Icon button for each of the doors to be unlocked.

If the project does not have any doors, or once the UNLOCK ladder is created, the subroutine 348 proceeds to step 358 (FIG. 13) to determine whether the project has any sliding or overhead doors. If the project does have sliding or overhead doors, the subroutine 348 proceeds to step 360 to create a SLIDERS_OH ladder. Similar to ladder 18 of program 10, discussed above, the SLIDERS_OH ladder is the logic for controlling how long power is to be applied to sliding and overhead doors while such doors are opening and closing by using timers to control the duration of the door travel. If the project does not have any sliding or overhead doors, or once the SLIDERS_OH ladder has been created, the subroutine proceeds to step 362.

In step 362, the subroutine 348 determines whether the project has or requires any full-cycle locks. Full-cycle locks, as described above, are operated by power supplied to the lock for only a brief moment or "pulse." The internal components of the lock cause the motor in the lock to rotate a movable component of the lock a full 360 degrees. If the project has full-cycle locks, the subroutine proceeds to step 364 where a PULSED_DOOR ladder is created. Similar to ladder 17 of program 10, the pulsed door function writes the logic necessary to implement the pulse of power needed to unlock a full-cycle door. If the project does not have any full-cycle locks, or once the PULSED_DOOR ladder is created, the subroutine 348 proceeds to step 366 (shown in FIG. 12).

In step 366, the subroutine 348 again determines whether the project has any sliding or overhead doors. If the project does have sliding or overhead doors, the subroutine 348 proceeds to step 368 to create a STOP_CMD ladder. Similar to ladder 14 of program 10, this stop command function operates to allow the user to stop the operation of any of the sliding or overhead doors. If the project does not have any sliding or overhead doors, or once the STOP_CMD ladder is created, the subroutine 348 proceeds to step 370.

In step 370, the subroutine 348 determines whether the project has a door isolation function, similar to the door isolation function described above with respect to program 10 and subroutine 16. If the project has the door isolation function, the subroutine 348 proceeds to step 372 to create ladder DOOR_ISO, the logic for the door isolation function. As described above, the door isolation function isolates electrically controlled doors, or doors that are also controlled by field mounted access devices, to prohibit the doors from normally being opened. Once the DOOR_ISO ladder is created, or if the project does not have the door isolation function, the subroutine 348 proceeds to step 374.

In step 374, the subroutine 348 determines whether the project has an intercom isolation function. As is discussed above with respect to ladder 19 of program 10, the intercom isolation function permits the user to shut off an intercom station so no audible incoming calls are received. If the project has an intercom isolation function, the subroutine 348 proceeds to step 376 to create a ladder ICOM_ISO to perform the intercom isolation function. Once the ICOM_ISO ladder has been created, or if the project does not have the intercom isolation function, the subroutine 348 proceeds to step 378.

In step 378, subroutine 348 creates an INPUTS_DPS ladder. The INPUTS_DPS ladder logic maps all of the inputs into a file and then perform a One-Shot function. The One-Shot function of program 310 is described in detail above with respect to Ladder 8 of program 10.

The INPUTS_DPS ladder also contains the logic for a Bounceless Door Position Switch (DPS) function. The Bounceless DPS function is also described in detail above with respect to Ladder 8 of program 10.

Once the INPUTS_DPS ladder has been created, the subroutine 348 proceeds to step 380 to determine whether the project has any intercoms. If the project has one or more intercoms, the subroutine 348 proceeds to step 382 to create an INTERCOM ladder. The INTERCOM ladder functions to control the intercom system similar to ladders 4 and 6 described in detail above with respect to program 10.

Once the INTERCOM ladder has been created, or if the project does not have any intercoms, the subroutine 348 proceeds to step 384 (FIG. 13) to determine whether the project has any cameras. If the project does have one or more cameras, the subroutine 348 proceeds to step 386 to create a VIDEO ladder. This ladder contains the logic that controls the cameras within the customer's facility.

Once the VIDEO ladder is created, or if the project does not have any cameras, the subroutine 348 proceeds to step 388 (FIG. 14) to determine whether the project has the Quick Comm feature discussed above with respect program 10. If the project has the Quick Comm feature, the subroutine 348 proceeds to step 390 to create a QUICKCOMM ladder which includes all the Quick Comm logic for all touchscreens. Once the QUICKCOMM ladder has been written, or if the project does not have the Quick Comm feature, the subroutine 348 proceeds to step 392 to determine whether the project has any interlock functions.

The interlock function controls the operation of the individual hardware sets where two or more doors form a sallyport, or where interlocks between hardware sets are indicated in the specifications of the jobsite facility. If the project includes one or more interlock functions, the subroutine 348 proceeds to step 394 to create an INTERLOCKS ladder, similar to ladder 10 of program 10, to control the interlock functions. Once the INTERLOCKS ladder has been written, or if the project does not include any interlock functions, the subroutine proceeds to step 396.

In step 396, subroutine 348 creates a TIMER_AA ladder to control the Alternate Action function described above with respect to ladder 5 of program 10. Once the TIMER_AA ladder has been written, the subroutine 348 proceeds to step 398 to determine whether the project has any utilities.

If the project has any utilities, the subroutine 348 proceeds to step 400 to create a UTILITIES ladder. The UTILITIES ladder, similar to ladder 23 discussed above with respect to program 10, controls the functions of each of the utilities within the customer's facility such as the lights, TV, and/or telephones, for example. Once the UTILITIES ladder is written, or if the project does not have any utilities, the subroutine 348 proceeds to step 402.

In step 402, the subroutine 348 determines again whether the project has any intercoms. If the project does have one or more intercoms, the subroutine proceeds to step 404 to create a PENDING ladder. The logic for the PENDING ladder, as discussed above with respect to ladder 20 of program 10, permits the monitoring of intercom stations where call buttons have been pressed, but where the intercom has not yet been connected for communication. Once the logic for the PENDING ladder is written, or if the project does not include any intercoms, the subroutine 348 proceeds to step 406 shown in FIG. 14.

In step 406, the subroutine 348 determines whether the project has any alarms. If the project has one or more alarms, the subroutine proceeds to step 408 to create an ALARMS ladder. The logic for the ALARMS ladder, similar to ladder 27 of program 10, controls the function and operation of the alarm(s) within the customer's facility such as fire alarms and duress alarms, for example. Once the logic for the ALARMS ladder has been created, or if the project does not have any alarms, the subroutine 348 proceeds to step 410.

In step 410, the subroutine 348 determines whether the project has any paging needs or capabilities. If the project has paging capabilities, the subroutine proceeds to step 412 to create a PAGE ladder. The logic for the PAGE ladder controls the operation and function of the page system within the customer's facility. Once the PAGE ladder logic has been written, or if the project does not have any paging capabilities, the subroutine 348 proceeds to step 414.

In step 414, the subroutine 348 determines once again whether the project has any doors. If it is determined that the project has doors, the subroutine proceeds to step 416 to create a DOOR_VIO ladder. The DOOR_VIO ladder includes the logic for the door violation system. The DOOR_VIO ladder also includes the logic for the Silence and Reset functions. In general, a door violation is defined as any time a monitored door in a facility is opened by a means other than the PLC and is described above in more detail with respect to ladder 16 of program 10.

In step 418, the subroutine 348 determines whether the project has any group functions or actions designated for both the door and intercom systems. If the project has one or more group functions, the subroutine proceeds to step 420 to create a GROUP_PBS ladder. As is discussed above with respect to ladder 9 of program 10, the logic for the GROUP_PBs ladder controls all the group functions or actions designated for both the door and the intercom systems. The group function permits a control procedure such as, for example, Unlock, Hold Open, Stop, Local Access or Isolate, to be performed on a predetermined group of devices. The system designer defines the groups during a submittal phase of the project when the submittal schedule or spreadsheet is created. There can be many separate groups, depending on the layout of the facility. Typically, these groups are made of cell doors that open into the same pod or dayroom, for example. A button is assigned to each group for executing the operation desired. Once the logic for the GROUP_PBs ladder is written, or if the project does not include any group functions, the subroutine 348 proceeds to step 422.

In step 422, the subroutine 348 creates an SMS ladder. The logic for the SMS ladder controls the logic for the Informer™ functions described above with respect to ladder 24 of program 10. Once the SMS ladder has been written, the subroutine proceeds to step 424.

In step 424, the project determines once again whether the project has any doors. If the project does include doors, the subroutine 348 proceeds to step 426 to write an EMER_REL ladder, similar to ladder 12 of program 10 discussed above. The EMER_REL ladder contains the logic that controls an Emergency Door Release function. An emergency release group of doors is read from the Submittal Schedule 12 and placed in the appropriate mask. In general, the Emergency Door Release function is located on selected touchscreens as an icon labeled Emergency Door Release. After the operator presses the icon, the operator is permitted to page through all screens to see which doors are to be unlocked. After a third confirmation is pressed by the operator, all doors of the specified route will open. The operation can be canceled at any time by pressing the Cancel button.

Once the logic for the EMER_REL ladder has been written, or if the project does not have any doors, the subroutine 348 proceeds to step 428. In step 428, the subroutine 348 determines whether the project requires a Watch Tour function. If the project has the Watch Tour function, the subroutine 348 proceeds to step 430 (FIG. 14) to write the logic for a WATCH_TOUR ladder. If the project does not have the Watch Tour function, this ladder is not created.

Watch Tours are in place as a means of tracking whether or not an officer walks through the facility to supervise the inmates. Watch Tour stations are located in the facility for the officers to depress. Inputs from these stations are connected to the I/O cards of the PLC. Tours are initiated at the touchscreen with primary control over a defined area. When a local touchscreen is disabled, the touchscreen that has taken over control of that area shall be able to initiate an individual Watch Tour for that area. Watch Tour stations are hidden off the screen until a Watch Tour is initiated. Watch Tour stations then appear on the screen. Once a station is pressed, it will change from orange to gray. When a Watch Tour is initiated, a count down counter will start. If all stations in the tour are not activated prior to the end of the count down, the touchscreen will flash in red all stations not activated in the tour. The DVI will annunciate "Watchtour Failed". When the Watch Tour is not active, the count down timer window is used to display the amount of time elapsed since the last successfully completed tour. This ladder also maps the inputs for watch tour stations based on the Submittal Schedule 12.

Figure 14:
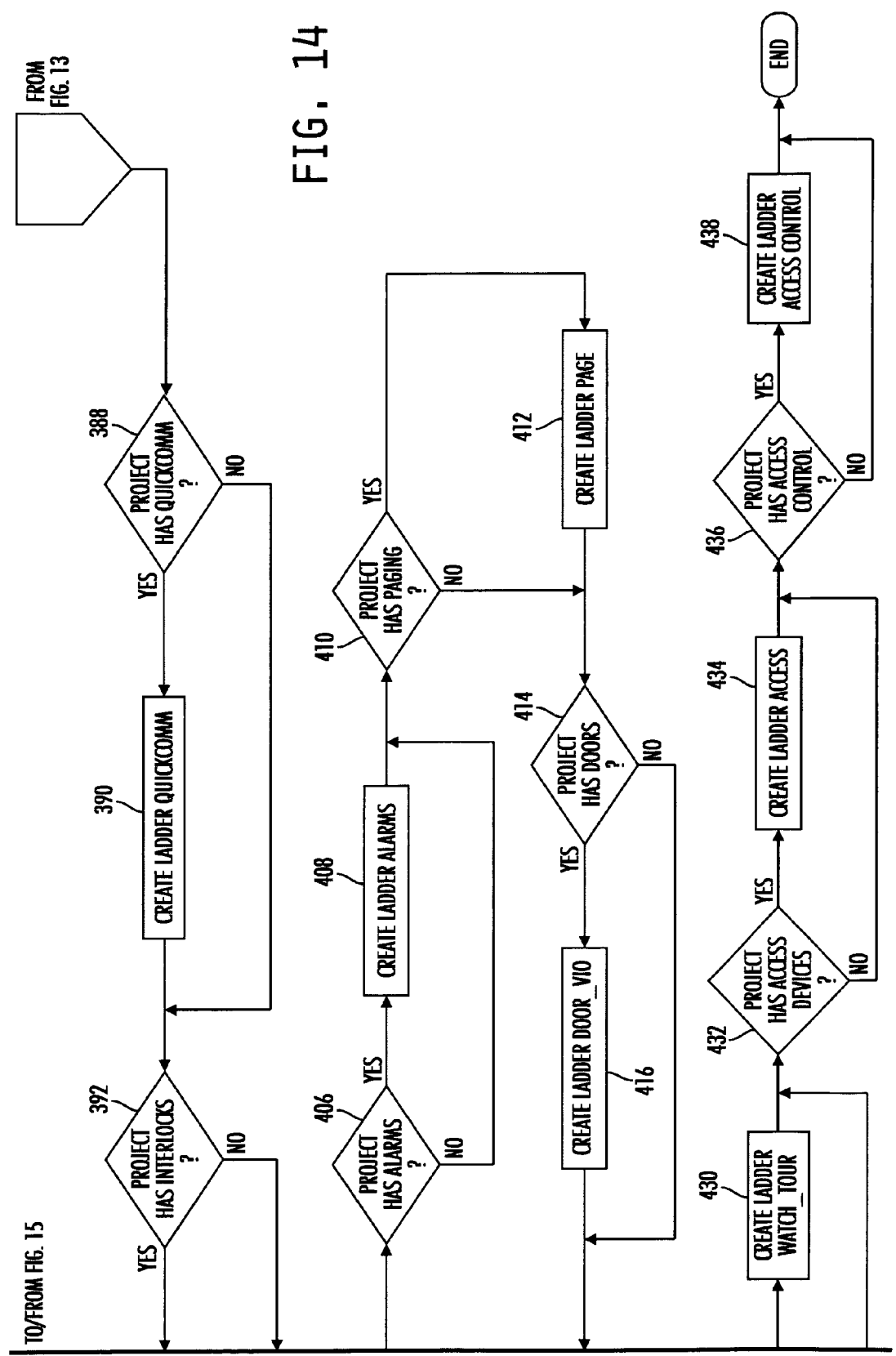
Figure 15:
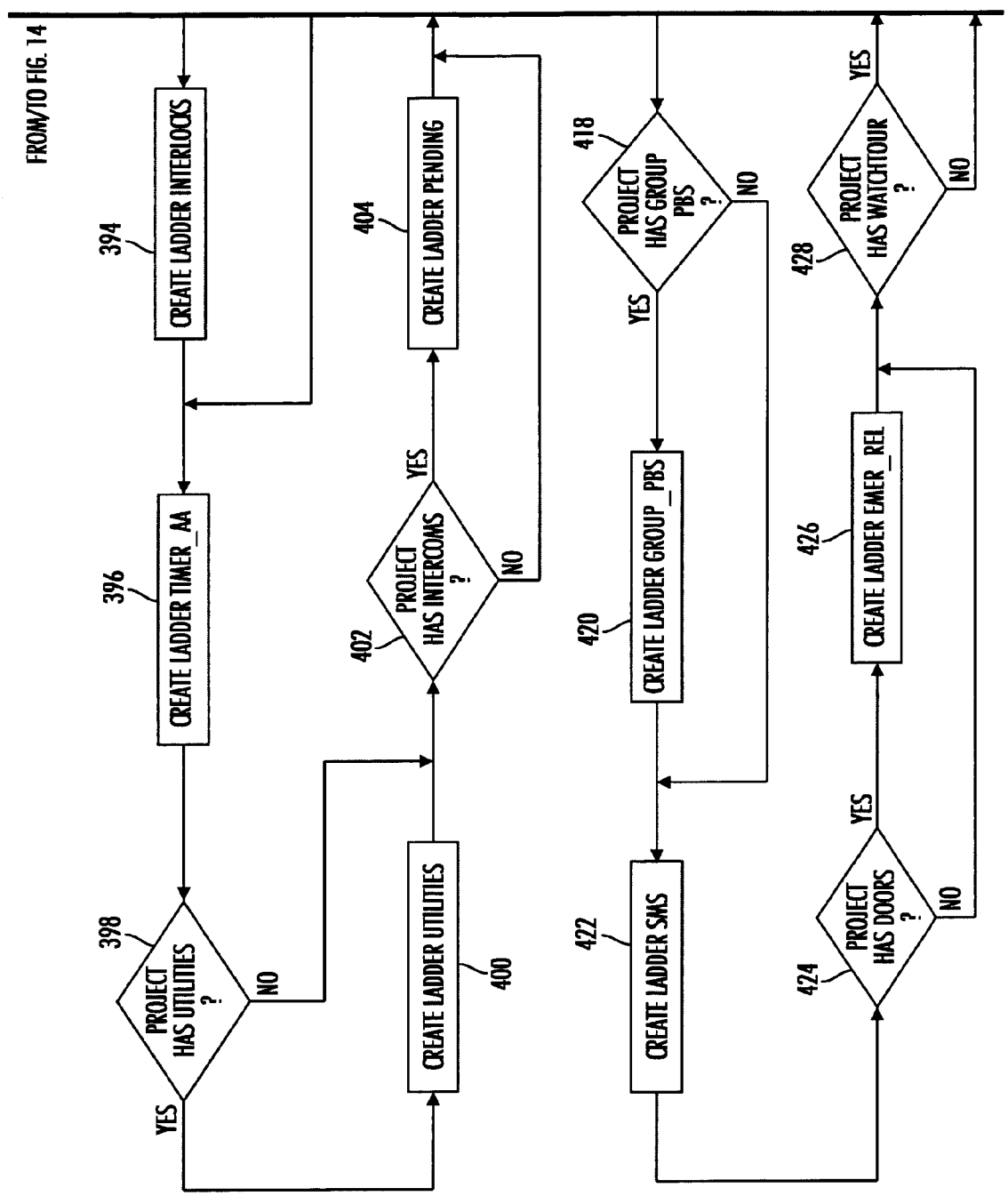

Once the logic for the WATCH_TOUR ladder has been written, or if the project does not have a Watch Tour function, the subroutine 348 proceeds to step 432 shown in FIG. 14. In step 432, the subroutine 348 determines whether the project has Access Devices. If the project has Access Devices, the subroutine 348 proceeds to step 434 to create the logic for an ACCESS ladder to control the Access Devices. If the project does not have Access Devices, the ACCESS ladder is not created. The ACCESS ladder contains the PLC logic necessary to monitor and process Dry Contact Door Lock Requests. These include, but are not limited to, Door Release Push Buttons and Hirsch Door Control relay contacts. Once the logic for the ACCESS ladder is written, or if the project does not include any Access Devices, the subroutine 348 proceeds to step 346.

In step 436, the subroutine 348 determines whether the project includes an access control system. One access control system, for example, is the GateKeeper™ Access Control System. The GateKeeper™ System is available from integrator.com, Inc. and is an access control application that allows users to be enrolled into the system and then given permission to access resources such as doors, for example, during designated times. The GateKeeper™ System further permits each user to be configured for each of the following: user name, proximity card ID, operator-definable access groups, such as, for example, administration, jail staff, sheriff's staff, and so on, definable time groups such as, for example, first shift, second shift, third shift, and so on, assign group access to any individual door, and assign individual user access to any individual door. If the project has the access control system, the subroutine proceeds to step 438 to write the logic for an ACCESS CONTROL ladder. If the project does not have the access control system, this ladder is not created. This ladder contains the logic necessary to interface with the access control software used by the security facility, such as the GateKeeper™ Access Control software.

Once the logic for the ACCESS CONTROL ladder is written, or if the project does not include an access control system, the subroutine ends. As mentioned above with respect to the main program flow of program 310, illustrated in FIG. 11, once the ladder logic for the specific project is completed, appropriate ".csv" files are created as outlined above with respect to step 338.

Although this invention has been described in detail with reference to certain embodiments, variations and modifications exist within the scope and spirit of the invention as described and defined in the following claims.

The invention claimed is:

1. A method for programming a programmable logic controller (PLC) for a system of a secured facility, the method comprising creating an electronic spreadsheet including information relating to devices and functions of the system of the secured facility to be controlled by the PLC, analyzing the electronic spreadsheet, and writing PLC logic to control the system of the secured facility based on information from the electronic spreadsheet.

2. The method of claim 1 wherein analyzing the spreadsheet includes opening the spreadsheet, reading the spreadsheet, and calculating the number of each device type within the spreadsheet.

3. The method of claim 2 wherein analyzing the spreadsheet further includes determining a number of required files and assigning PLC file designators to the files.

4. The method of claim 3 wherein the spreadsheet includes information relating to a user interface station and analyzing the spreadsheet further includes calculating a number of user interface stations.

5. The method of claim 4 wherein analyzing the spreadsheet further includes creating a software documentation file including the number of each device type, the PLC file designator, and the number of user interface stations.

6. The method of claim 5 wherein analyzing the spreadsheet further includes passing the file numbers and the number of user interface stations to a write-PLC logic subroutine for writing the logic to control the system.

7. The method of claim 1 wherein analyzing the spreadsheet includes transferring information within the spreadsheet to a database.

8. The method of claim 7 wherein writing PLC logic to control the system includes transferring data between a write-PLC logic subroutine and the database.

9. The method of claim 7 wherein writing PLC logic to control the system includes transferring data between a write-PLC logic subroutine and the spreadsheet.

10. The method of claim 1 wherein writing PLC logic to control the system includes writing ladder logic algorithms to control the devices and functions listed within the spreadsheet.

11. The method of claim 1, wherein the PLC logic is configured to control at least one of a door lock, video camera, intercom, card reader, secured facility alarm, secured facility toilet, secured facility lighting, and a secured facility utility.

12. The method of claim 11, wherein the secured facility to be controlled by the PLC logic is at least one of a jail, prison, and detention facility.

13. A method for programming a programmable logic controller (PLC) for a secured facility, the method comprising:

entering customer information including security devices and functions of a system for the secured facility to be automated into an electronic spreadsheet, reading the customer information from the electronic spreadsheet, storing the customer information from the electronic spreadsheet in a database, analyzing the database, and generating a software program based on the customer information in the database.

14. The method of claim 13 wherein analyzing the database includes determining quantities and types of security devices of the system to be controlled by the PLC.

15. The method of claim 14 wherein generating the software program includes creating a program file for the PLC, creating a PLC tag database, and setting device masks.

16. The method of claim 15 further comprising generating a software tag listing including the tags used from the PLC tag database and the purpose of each tag.

17. The method of claim 15 further comprising assigning names to specific devices and functions and creating files containing the names assigned to the specific devices and functions.

18. The method of claim 17 wherein creating files containing the names assigned to the specific devices and functions includes creating files containing configuration information for the devices and functions.

19. The method of claim 13 wherein analyzing the database includes determining whether the system is to include more than one PLC.

20. The method of claim 13 further including displaying a user interface with results of the analysis of the customer information.

21. The method of claim 20 further including modifying at least one of customer information and the database.

22. The method of claim 13, wherein the customer information relates to at least one of a type of door lock provided in the security facility and a number of door locks provided in the security facility.

23. A method for programming a programmable logic controller (PLC) for automating and controlling a security system, the method comprising:

identifying customer information including devices of the security system, a location of each device of the security system, and a quantity of each device of the security system, creating an electronic spreadsheet including the customer information, checking the electronic spreadsheet, storing customer information from the electronic spreadsheet in a database, analyzing the customer information in the database, displaying a user interface with results of the analysis of the customer information, modifying at least one of customer information and the database via the user interface to create modified results, transferring the modified results to a subroutine, and writing PLC software configured to automate and control the security system based on the customer information.

24. The method of claim 23 wherein analyzing the database includes determining a number of PLC's, a number of floor plan screens, and a quantity of each device type.

25. The method of claim 23 wherein checking the spreadsheet includes opening the spreadsheet, reading the spreadsheet, and verifying that the customer information in the spreadsheet is of the proper type and value range.

26. The method of claim 23 wherein identifying customer information includes identifying the termination point of each device and identifying the I/O necessary to make each device operate.

27. The method of claim 23, wherein the customer information includes information related to at least one of a door lock, video camera, intercom, card reader, secured facility alarm, secured facility toilet, secured facility lighting, and a secured facility utility.

28. A computer system for programming a programmable logic controller (PLC) for use with a secured facility, the computer system comprising:

a processing unit, and a memory electrically coupled to the processing unit, the memory having stored therein a plurality of instructions which, when executed by the processing unit, causes the processing unit to (i) transfer customer-entered information from an electronic spreadsheet to a database for storage of the customer-entered information,
(ii) analyze the customer-entered information, and
(ii) write PLC logic to control the secured facility based on the customer-entered information.

29. The computer system of claim 28, wherein the customer-entered information relates to at least one of a door lock, video camera, intercom, card reader, secured facility alarm, secured facility toilet, secured facility lighting, and a secured facility utility.

30. A method for programming a programmable logic controller (PLC) for controlling a security facility, the method comprising:
writing at least one of the following door ladders: an autorelock ladder to automatically lock doors that are unlocked, an unlock ladder to selectively unlock a door, a door-violation ladder to inform an operator that a door in the facility has been opened by a means other than the PLC, and an emergency release ladder to selectively unlock an emergency release group of doors,
determining whether the security facility has one or more sliding or overhead doors,
writing at least one of the following ladders if the security facility has one or more sliding or overhead doors: a sliding-overhead ladder to control an amount of time power is applied to one or more of the sliding or overhead doors to control a duration of the travel of the one or more sliding or overhead doors, and a stop command ladder to selectively stop the operation of the one or more sliding or overhead doors,
determining whether the security facility has one or more intercoms,
writing at least one of the following ladders if the security facility has one or more intercoms: an intercom ladder to control operation of the one or more intercoms, and a pending ladder to monitor the one or more intercoms if a call button of the one or more intercoms has been pressed prior to connection of the one or more intercoms for communication,
writing a pulsed-door ladder to unlock one or more full-cycle locks of the security facility,
determining whether the security facility requires a door isolation function,
writing a door isolation ladder if the security facility requires a door isolation function to isolate select doors and prohibit the select doors from normally being opened,
determining whether the security facility requires an intercom isolation function,
writing an intercom isolation ladder if the security facility requires an intercom isolation function to selectively deactivate one or more intercoms to prevent audible incoming calls from being received from those intercoms which have been deactivated,
determining whether the security facility has one or more video cameras,
writing a video ladder if the security facility has one or more video cameras to control the one or more video cameras within the security facility,
determining whether the security facility requires a communication feature,
writing a quick-comm ladder if the security facility requires the communication feature to establish audio communications from a control panel when a user presses a communications button of an intercom within the facility,
writing an interlock ladder to control the operation of one or more hardware sets where two or more doors form a sallyport,
determining whether the security facility has one or more utilities,
writing a utilities ladder if the security facility has one or more utilities to control the functions of the one or more utilities,
determining whether the security facility has one or more alarms,
writing an alarms ladder if the security facility has one or more alarms to control the functions of the one or more alarms,
determining whether the security facility has one or more predetermined groups of devices designated for at least one of the door and intercom systems,
writing a group ladder if the security facility has one or more groups of devices designated to selectively control the functions of the one or more predetermined groups of devices,
determining whether the security facility has one or more watchtour stations,
writing a watchtour ladder if the security facility has the one or more watchtour stations to monitor an activation of the one or more watchtour stations by an officer patrolling the facility,
determining whether the security facility has one or more access devices,
writing an access ladder if the security facility has the one or more access devices to monitor and process door unlock requests,
writing an inputs ladder to control the number of times a bit is turned on within the PLC and to de-bounce a switch within the PLC for security facility functions controlled by the PLC which bounce before reaching a steady state position,
writing a timer ladder to turn bits on and off in the PLC,
writing an SMS ladder to interface with software of a security management server of the facility to translate data in the PLC to a form that is readable by the user, and
electronically storing the ladders after they are written.

31. The method of claim 30, further comprising determining whether the security facility has one or more full-cycle locks before the step of writing the pulsed-door ladder, and wherein the step of writing the pulsed-door ladder includes writing the pulsed-door ladder if the security facility has one or more fullcycle locks.

32. The method of claim 30, further comprising determining whether the security facility requires the interlock function before the step of writing the interlock ladder, and wherein the step of writing the interlock ladder includes writing the interlock ladder if the security facility requires the interlock function.

33. The method of claim 30, further comprising determining whether the security facility has one or more access control systems, and writing an access control ladder if the security facility has one or more access control systems to configure each user of the facility for one or more of the following: user name, proximity card identification, operator-definable access groups, and operator-definable time groups.

* * * * *